US012703448B2

(12) United States Patent
Shipman et al.

(10) Patent No.: US 12,703,448 B2
(45) Date of Patent: Aug. 11, 2026

(54) HEIGHT ADJUSTABLE SEAT POSTS FOR BICYCLES

(71) Applicant: SRAM, LLC, Chicago, IL (US)

(72) Inventors: Christopher Shipman, Chicago, IL (US); Sage Hahn, Chicago, IL (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 54 days.

(21) Appl. No.: 18/473,473

(22) Filed: Sep. 25, 2023

(65) Prior Publication Data

US 2025/0100639 A1 Mar. 27, 2025

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC .............................. B62J 1/08; B62J 2001/085
USPC ...................................................... 297/195.1
See application file for complete search history.

(56) References Cited

U.S. PATENT DOCUMENTS

| | | | |
|---|---|---|---|
| 6,158,881 A * | 12/2000 | Carne ........................ B62J 1/08 362/183 |
| 8,016,349 B2 | 9/2011 | Shimano |
| 8,091,910 B2 | 1/2012 | Shimano |
| 8,246,065 B1 | 8/2012 | Shimano |
| 8,308,124 B2 | 11/2012 | Hsu |
| 8,328,454 B2 | 12/2012 | McAndrews et al. |
| 8,814,109 B2 | 8/2014 | Laird et al. |
| 8,833,786 B2 | 9/2014 | Camp et al. |
| 8,833,848 B2 | 9/2014 | Shirai |
| 9,272,745 B2 | 3/2016 | Camp et al. |

(Continued)

FOREIGN PATENT DOCUMENTS

| | | |
|---|---|---|
| CN | 203345112 U | 12/2013 |
| CN | 201320667836 | 5/2014 |

(Continued)

OTHER PUBLICATIONS

Overholt, Zack; Taipei Cycle Show: KS Hints Towards the Future of Electronic Dropper Posts; Website: https://bikerumor.com/taipei-cycle-show-ks-hints-towards-the-future-of-electronic-dropper-posts/, last checked Feb. 1, 2023.

(Continued)

*Primary Examiner* — Jose V Chen

(57) ABSTRACT

Height adjustable seat posts for bicycles are described herein. An example height adjustable seat post includes an upper tube and a lower tube configured in a telescopic arrangement. The height adjustable seat post includes a piston assembly in the upper tube that divides the upper tube into a first chamber and a second chamber. The piston assembly includes a valve to control fluid flow between the first and second chambers. The height adjustable seat post also includes an actuator to operate the valve. The height adjustable seat post further includes a connector assembly connected to the lower tube. The connector assembly is to be connected to a mating connector assembly on the bicycle. The connector assembly includes a magnetic connector including a housing having an end surface with an opening, first and second electrical contacts in the opening, and a magnet disposed in the housing and spaced from the end surface of the housing.

20 Claims, 26 Drawing Sheets

(56) References Cited

U.S. PATENT DOCUMENTS 9,422,018 B2 8/2016 Pelot et al.
9,499,224 B2 11/2016 Shirai
9,511,809 B2 12/2016 Kodama et al.
9,540,063 B1 * 1/2017 Shirai ........................ B62J 1/08
9,840,294 B2 12/2017 Hara
10,040,499 B2 8/2018 Hara et al.
10,137,964 B2 11/2018 Kurokawa et al.
10,322,762 B2 6/2019 Shirai
10,336,400 B2 7/2019 Hara
10,358,180 B2 7/2019 Shipman et al.
10,392,020 B2 8/2019 Komatsu et al.
10,472,013 B2 11/2019 Pelot et al.
10,549,803 B2 2/2020 Shipman et al.
10,604,201 B2 3/2020 Shirai et al.
10,611,433 B2 4/2020 Chambers
10,618,589 B2 4/2020 Hara et al.
10,676,146 B2 6/2020 Hara et al.
10,710,662 B2 7/2020 Bowers et al.
10,737,546 B2 8/2020 Tong
10,752,307 B2 8/2020 Eberlberger
10,759,483 B2 9/2020 Hara et al.
10,787,215 B1 9/2020 Staples
10,807,667 B2 10/2020 Shipman et al.
10,807,670 B2 10/2020 Krugman et al.
10,829,173 B2 11/2020 Hara et al.
10,843,757 B2 11/2020 Komatsu et al.
10,953,950 B2 3/2021 Komatsu et al.
10,988,198 B2 4/2021 Komatsu et al.
10,988,205 B2 4/2021 Tsuchizawa et al.
11,001,323 B2 5/2021 Kurokawa
11,066,118 B2 7/2021 Katsuki et al.
11,066,126 B2 7/2021 Kurokawa et al.
11,104,395 B2 8/2021 Staples
11,136,083 B2 10/2021 Shirai
11,161,565 B2 11/2021 Kurotobi et al.
11,787,499 B2 10/2023 Takeshita
12,296,907 B2 * 5/2025 Jordan .................... F16B 2/065
2013/0202938 A1 8/2013 Fujii
2017/0096184 A1 * 4/2017 Hara .......................... B62J 1/08
2017/0282986 A1 10/2017 Jhou
2017/0341692 A1 * 11/2017 Shirai .................... B62K 19/36
2019/0009852 A1 1/2019 Shirai
2019/0061851 A1 2/2019 Kurokawa
2019/0092116 A1 3/2019 Magnus et al.
2020/0023918 A1 1/2020 Shirai
2020/0140029 A1 5/2020 Shipman et al.
2020/0148300 A1 5/2020 Komatsu et al.
2020/0317283 A1 10/2020 Staples
2020/0377176 A1 12/2020 Shirai et al.
2021/0001941 A1 1/2021 Shipman et al.
2021/0024154 A1 1/2021 Hara et al.
2021/0031851 A1 * 2/2021 Watson ...................... B62J 1/28
2021/0107581 A1 4/2021 Hara et al.
2021/0107588 A1 4/2021 Sakagawa et al.
2021/0206443 A1 7/2021 Sakagawa et al.
2021/0403111 A1 12/2021 Chambers et al.
2022/0041234 A1 2/2022 Sakagawa
2022/0041237 A1 2/2022 Tso et al.
2022/0106005 A1 4/2022 Shirai et al.
2022/0126938 A1 * 4/2022 Sakagawa .............. B62K 25/08
2022/0135160 A1 * 5/2022 Sheng ...................... B62J 43/20
297/215.13
2023/0192208 A1 * 6/2023 Watson .................... B62J 45/41
701/49
2023/0249781 A1 8/2023 Takeshita
2024/0166286 A1 * 5/2024 Chambers ................ B62J 43/30
2024/0417013 A1 * 12/2024 Dunlap ...................... B62J 1/08
2025/0010932 A1 * 1/2025 Shirai ........................ B62J 1/08
2025/0100638 A1 * 3/2025 Shipman .................. B62J 45/00
2025/0100640 A1 * 3/2025 Shipman ................ B62K 19/36

FOREIGN PATENT DOCUMENTS

CN 204489030 U 7/2015
CN 107685824 B2 9/2020
DE 102016010845 4/2017
DE 102016010857 4/2017
DE 102018102783 A1 9/2018
DE 102018119985 A1 2/2019
DE 102021123822 A1 4/2022
EP 2457811 5/2012
EP 2657113 10/2014
EP 2865586 4/2015
EP 2886428 6/2015
TW M378163 U 4/2010
TW 201217209 5/2012
TW I562922 12/2016
TW I671226 9/2019

OTHER PUBLICATIONS

Levy, Mike; First Look: KS Electronic Wireless Dropper Post—Taipei Show 2014; https://www.pinkbike.com/news/ks-electronic-wireless-dropper-post-first-look.html, last checked Feb. 1, 2023.

* cited by examiner

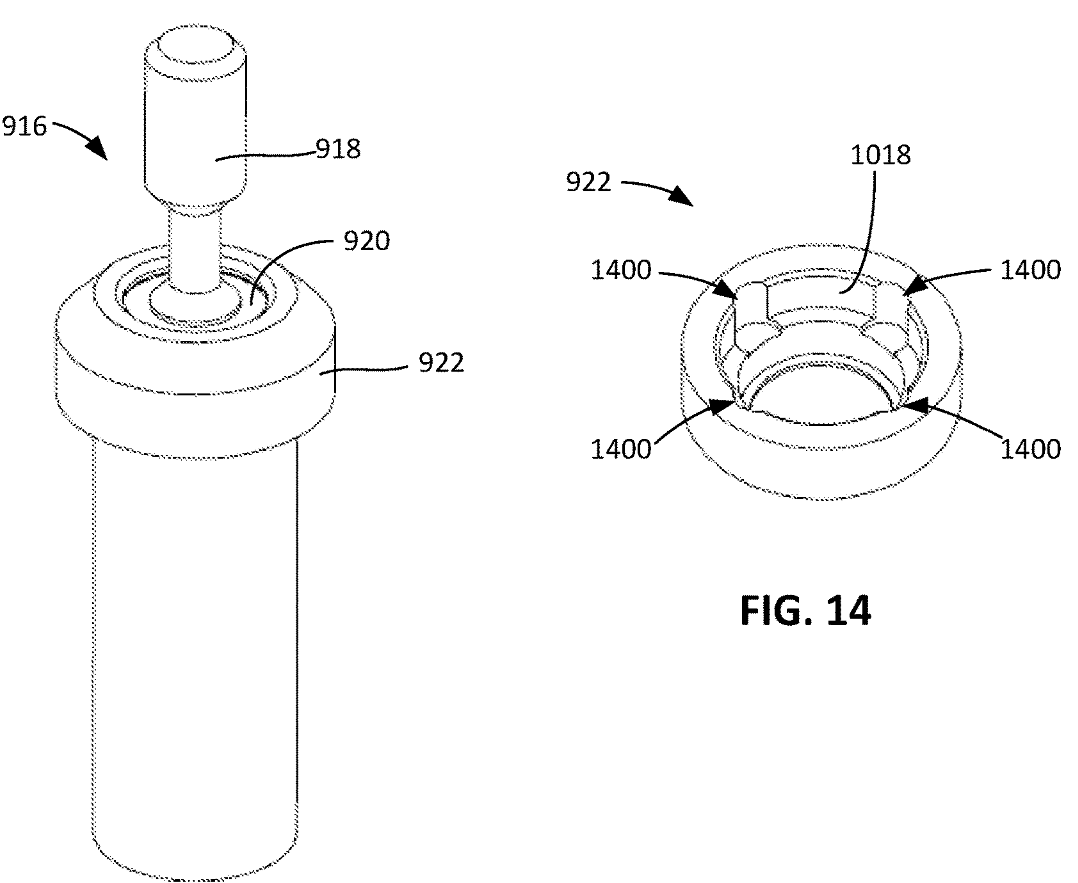
FIG. 13
FIG. 14
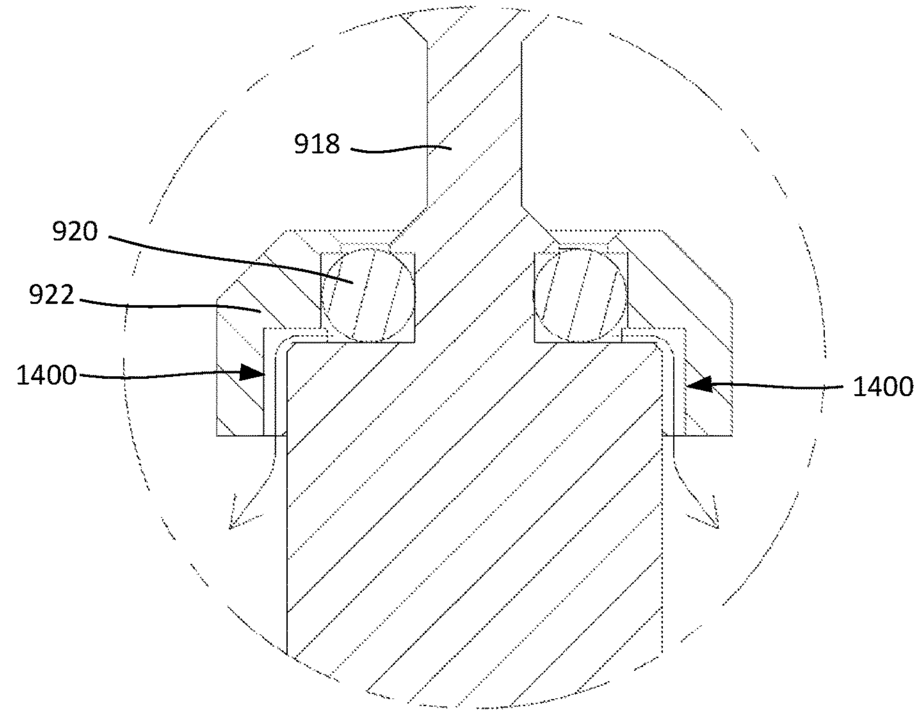
FIG. 15

2002
3600
116

3600
2002
2404
116

3600
2404
116

HEIGHT ADJUSTABLE SEAT POSTS FOR BICYCLES

FIELD OF THE DISCLOSURE

This disclosure relates generally to bicycle components and, more specifically, to height adjustable seat posts for bicycles.

BACKGROUND

Bicycles are known to have a seat or saddle to support a rider in a seated position. The seat is typically connected to the bicycle frame by a seat post. On most bicycles, the seat post can be manually adjusted to raise or lower the height of the seat to accommodate riders of different heights. The height may also be adjusted to accommodate different riding conditions. Typically, the seat post is mechanically clamped to a seat tube of the bicycle frame. When the clamp is released, the seat post is slidable up and down relative to the tube of the bicycle frame to adjust the height of the seat. On some recent higher end bicycles, the seat post is height adjustable during riding of the bicycle by employing some type of hydraulic assist mechanism. For example, manually actuated hydraulic height adjustable or dropper seat posts may use a hydraulic pressure differential within the seat post and require manual operation to adjust the seat post height. Some products may use ANT+ wireless communication technology allowing the rider to wirelessly adjust the seat post.

SUMMARY

An example height adjustable seat post for a bicycle includes an upper tube and a lower tube configured in a telescopic arrangement. The lower tube is to be coupled to a frame of the bicycle, and the upper tube is to be coupled to a seat. The height adjustable seat post includes a piston assembly in the upper tube. The piston assembly divides the upper tube into a first chamber and a second chamber. The first and second chambers are filled with fluid. The piston assembly includes a valve to control fluid flow between the first and second chambers. The height adjustable seat post also includes an actuator to operate the valve. The height adjustable seat post further includes a connector assembly connected to the lower tube. The connector assembly is to be connected to a mating connector assembly on the bicycle. The connector assembly includes a magnetic connector including a housing having an end surface with an opening, first and second electrical contacts in the opening, and a magnet disposed in the housing and spaced from the end surface of the housing.

An example connector system for electrically connecting a height adjustable seat post to an electrical system of a bicycle is disclosed herein. The connector system includes a seat post connector assembly to be connected to the height adjustable seat post. The seat post connector assembly includes a first magnetic connector including: a first housing having a first end wall with a first end surface, the first housing having a first opening formed through the first end wall; first and second electrical contacts at least partially disposed in the first opening; and a first magnet in the first housing, the first magnet spaced from the first end surface. The connector system also includes a bicycle connector assembly to be connected to the electrical system. The bicycle connector assembly includes a second magnetic connector including: a second housing having a second end wall with a second end surface, the second housing having a second opening formed through the second end wall; third and fourth electrical contacts at least partially disposed in the second opening; and a second magnet in the second housing, the second magnet spaced from the second end surface. A magnetic attraction between the first and second magnets holds the first and second magnetic connectors together such that the first end surface is in contact with the second end surface and the first and second electrical contacts are in contact with the respective third and fourth electrical contacts.

BRIEF DESCRIPTION OF THE DRAWINGS

FIG. 13 is a perspective view of an example plug assembly that is implemented in the example piston assembly of FIG. 9.

FIG. 14 is a bottom view of an example seal retainer of the example plug assembly of FIG. 13.

FIG. 15 is a cross-sectional view of the example plug assembly of FIG. 13.

The figures are not to scale. Instead, the thickness of the layers or regions may be enlarged in the drawings. In general, the same reference numbers will be used throughout the drawing(s) and accompanying written description to refer to the same or like parts.

Figure 1:
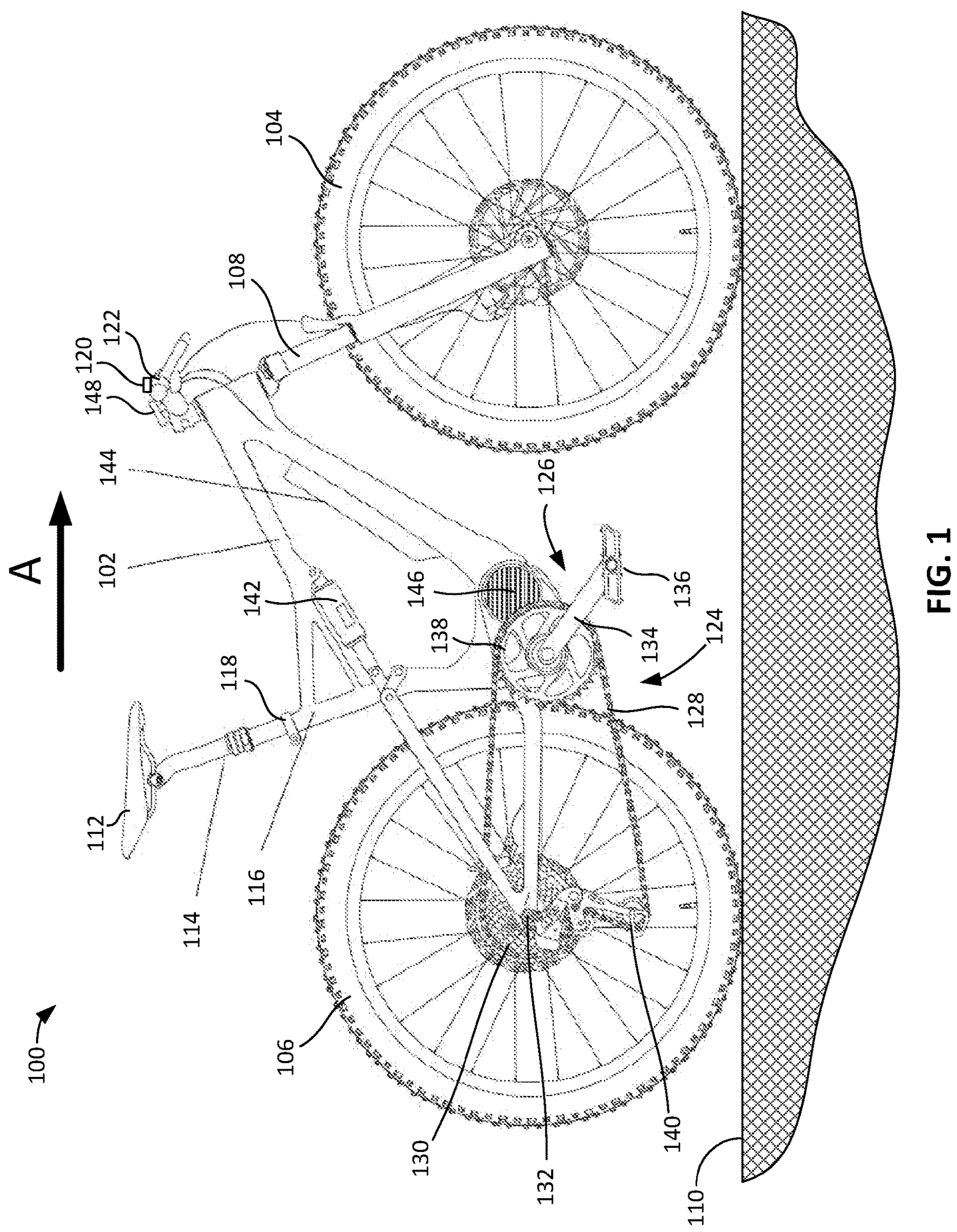
FIG. 1 is a side view of an example bicycle that may employ any of the example height adjustable seat posts and/or connector systems disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some modern bicycles include a height adjustable seat post, sometimes referred to as a dropper seat post. This type of seat post allows a rider to change the height of their seat while riding the bicycle. For example, the rider can actuate a seat post actuator on the handlebars and then push downward on the seat (e.g., with their bottom) to contract or compress the seat post, which thereby lowers the height of the seat. When the rider stops actuating the seat post actuator, the seat post is maintained in the contracted position. Then, when the rider desires to raise the seat, the rider can actuate the seat post actuator again and the seat post extends or expands to move the seat back to the original height. This lowering ability can be advantageous when the rider is about to ride the bicycle down a steep decline. For instance, it is often desired to lower the seat when riding down a decline so that the rider can stand up and lean backward without the seat hitting their bottom. This lowering ability can also be used to lower the seat before the rider encounters an incline, where the rider typically stands up and peddles. This raising/lowering ability is also advantageous to enable different riders to adjust the height of the seat quickly and easily to their comfort without having to manually operate the seat clamp. This adjustability can be used in many other scenarios as well.

Some dropper seat posts rely on hydraulic fluid and/or pneumatic pressure controlled by a mechanically or hydraulically actuated valve to change the height of the seat post. More recently, some dropper seat posts have used an electrically powered solenoid controlled by an electrical signal to actuate the valve. The seat post includes a piston assembly in an upper tube of the seat post that divides the upper tube into a positive chamber and a negative chamber. The piston assembly includes a piston that incorporates the valve and the solenoid. The valve can be opened to enable fluid flow across the piston between the positive and negative chambers and thereby enable the seat post to contract or expand or can be closed to block fluid flow to the piston and thereby lock the seat post in its current position or height. The piston defines a fluid passage. A seal is disposed in a seal gland in the fluid passageway. The solenoid, when activated, moves a plug relative to the seal to block or allow fluid flow through the fluid passageway. However, these types of seal arrangements are not always reliable as they are susceptible to a phenomenon known as extrusion under moderate/high air pressures in which the seal may become dislodged from the seal gland. Furthermore, in some instances, rather than remaining in its intended location, the seal deforms and follows the plug as the plug moves away from the seal in attempts to open the valve.

Disclosed herein are example height adjustable seat posts with unique seal arrangements that are less suspectable to extrusion and deformation and are therefore more reliable than known seal arrangements. An example seat post disclosed herein includes a piston assembly with a piston and a solenoid-operated valve. The valve includes a plug assembly that is moveable to open or close the valve. The plug assembly includes a plug, a seal (e.g., an O-ring), and a seal retainer for securing the seal to the plug. As such, the seal is coupled to and moves with the plug. The plug assembly is moveable between a closed position in which the seal is engaged with the piston, which blocks fluid flow through the fluid passageway of the piston, and an open position in which the seal is spaced from the piston and enables fluid flow through the fluid passageway. With respect to the terms "block" and "prevent," for purposes of the following discussion, the terms "block" and "prevent" refer to the most restricted gas flow attainable or desirable. Thus, in one example, the terms "block" and "prevent" mean a stoppage of all gas flow between the two chambers. However, in another example, the terms "block" or "prevent" mean substantially all gas flow is stopped between the two chambers. The example seal arrangement produces excellent sealing while preventing or reducing seal deformation. Further, the arrangement of the seal and the seal retainer prevents or reduces the extrusion effect noted above. Therefore, the example seal arrangement disclosed herein is more reliable than known seal arrangements. Also disclosed herein are unique arrangements of the solenoid in the piston assembly in which the wires for the solenoids are not disposed in the pressurized volumes of the positive and negative chambers. As such, the wires do not need to be sealed to prevent leakage, as encountered in known designs. This greatly reduces sealing issues and reduces manufacturing time and costs.

Also disclosed herein are example connector assemblies for electrically connecting a height adjustable seat post to a drive unit or electrical system of a bicycle. In some examples, a seat post connector assembly is coupled to the seat post (e.g., the bottom of the seat post), and a bicycle connector assembly is installed on the bicycle and electrically coupled to the drive unit or electrical system of the bicycle. The seat post connector assembly has a first magnetic connector with a first magnet and one or more electrical contacts or pins (e.g., spring-loaded pogo pins), and the bicycle connector assembly has a second magnetic connector with a second magnet and corresponding electrical contacts or pins. In some examples, the second magnetic connector is coupled to or installed in a bottom of a seat tube of the frame of the bicycle. When the seat post with the seat post connector assembly is inserted into the seat tube, the first magnetic connector automatically aligns with and connects to the second magnetic connector. When the first and second magnetic connectors are connected or mated, the pins contact the electrical contacts and thereby form an electrical connection between the seat post and the drive unit or electrical system of the bicycle. In this example, the magnets of the first and second magnetic connectors do not form the electrical contacts of the first and second magnetic connectors. As such, the first and second magnetic connectors are less susceptible to ferrous dirt and debris as seen in known magnetic connectors. Further, when the first and second magnetic connectors are connected, the magnets do not actually touch or contact each other. This makes it easier to separate the first and second magnetic connectors without causing damage to the wires or cables of the connector assemblies.

Turning now to the figures, FIG. 1 illustrates one example of a human powered vehicle on which the example seat posts, and connector assemblies disclosed herein can be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A. The bicycle 100 is shown on a riding surface 110. The riding surface 110 may be any riding surface such as the ground (e.g., a dirt path, a sidewalk, a street, etc.), a man-made structure above the ground (e.g., a wooden ramp), and/or any other surface.

In the illustrated example of FIG. 1, the bicycle 100 includes a seat 112 (sometimes referred to as a saddle) and a seat post 114 used to couple the seat 112 to the frame 102. In the illustrated example, the seat post 114 is coupled to a seat tube 116 of the frame 102. In some examples, the seat post 114 is coupled to the seat tube 116 by a clamp 118. The seat post 114 is height adjustable to raise or lower the seat 112. In particular, the seat post 114 can be compressed (shortened) or expanded (lengthened), without adjusting the clamp 118, to change the height of the seat 112 relative to the ground. In some examples, the bicycle 100 includes a seat post actuation button 120 to control the seat post 114, example operations of which are disclosed in further detail herein. The bicycle 100 also includes handlebars 122 coupled to the frame 102 and the front fork 108 for steering the bicycle 100. In the illustrated examples the seat post actuation button 120 is mounted on the handlebars 122 to enable a rider to interact with the seat post actuation button 120 while riding the bicycle 100. In other examples, the seat post actuation button 120 can be located on another portion of the bicycle 100.

In the illustrated example, the bicycle 100 has a drivetrain 124 that includes a crank assembly 126. The crank assembly 126 is operatively coupled via a chain 128 to a sprocket assembly 130 mounted to a hub 132 of the rear wheel 106. The crank assembly 126 includes at least one, and typically two, crank arms 134 and pedals 136, along with at least one front sprocket, or chainring 138. A rear gear change device 140, such as a derailleur, is disposed at the rear wheel 106 to move the chain 128 between different sprockets of the sprocket assembly 130. Additionally or alternatively, the bicycle 100 may include a plurality of front chainrings and a front gear change device to move the chain 128 between the plurality of chainrings.

The example bicycle 100 can include a suspension system having one or more suspension components. In the illustrated example, the bicycle 100 includes a rear suspension component 142. In this example, the rear suspension component 142 is implemented as or includes a shock absorber. In some examples, the front fork 108 is also implemented as a front suspension component. For example, a spring can be integrated into one of the legs and a damper can be integrated into the other leg. The front fork 108 and the rear suspension component 142 absorb shocks and vibrations while riding the bicycle 100 (e.g., when riding over rough terrain). In other examples, the front fork 108 and/or the rear suspension component 142 may be integrated into the bicycle 100 in other configurations or arrangements.

In this example, the bicycle 100 of FIG. 1 is an electric-assist bicycle, sometimes referred to as an electric bike or e-bike. The bicycle 100 includes an electrical system comprising a power source, implemented herein as a battery 144, and a drive unit 146. In the illustrated example, the battery 144 is coupled to the frame 102. In some examples, the battery 144 is a 36-volt battery. In other examples, the battery 144 can have a higher or lower voltage capacity. In some examples, the battery 144 is removeable, such as by pressing a release tab or button or sliding the battery 144 in a certain direction. In some examples, the battery 144 can be removed, charged, and reattached to the frame 102. Additionally or alternatively, the battery 144 can be charged while the battery 144 is attached to the frame 102. The battery 144 may be charged by wire or wirelessly. For example, the battery 144 can have a charging port or charging surface for charging.

In the illustrated example, the drive unit 146 is coupled to and/or otherwise integrated with the frame 102. The drive unit 146 is electrically coupled to the battery 144 via one or more wires routed through the frame 102. The drive unit 146 includes controller components as well as one or more motors or actuators for powering the bicycle 100. For example, the drive unit 146 may include a motor with a gear or sprocket that is engaged with the chainring 138. The controller components can activate the motor to drive the chainring 138 and thereby power the rear wheel 106. In this example, the drive unit 146 can also control the seat post 114. For example, the seat post 114 may be electrically actuated to enable a rider to adjust the seat height. The seat post 114 may be electrically coupled to the drive unit 146 via a connector system, details of which are disclosed in further detail herein. The drive unit 146 can control power (from the battery 146) to the seat post 114. The seat post actuation button 120 can be wired or wirelessly connected to the drive unit 146. When the seat post actuation button 120 is pressed, the drive unit 146 applies power to the seat post 114, which activates an internal actuator (e.g., a solenoid) to enable the seat post 114 to compress (shorten) or expand (lengthen), examples of which are disclosed in further detail herein. When the seat post actuation button 120 is released, the drive unit 146 cuts off power to the seat post 114, and the seat post 114 is locked in its current state or position.

The controller components of the drive unit 146 can be implemented by processor circuitry. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In some examples, one or more of the other components of the bicycle 100 may also include electronic components for controlling and/or monitoring various aspects of the bicycle 100. For example, the bicycle 100 of FIG. 1 includes a control device or bicycle computer 148 that is mounted on the handlebars 122. The bicycle computer 148 may wirelessly communicate with the seat post 114, the rear gear change device 140, the front fork 108, the rear suspension component 142, and/or the drive unit 146 to collect data and/or control operation of the respective components. The bicycle computer 148 may also wirelessly communicate with a power meter of the crank assembly 126. The foregoing components may be paired to a wireless network. Although the present specification may describe components and functions that may be implemented embodiments with reference to particular standards and protocols, the examples disclosed herein are not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth®, ANT+™, ZigBee, Wi-Fi and/or AIREA™ standards may also, or alternatively, be used. Accordingly, replacement standards and protocols having the same or similar functions as those disclosed herein are considered equivalents thereof.

While the example bicycle 100 depicted in FIG. 1 is a type of mountain bicycle, the example height adjustable seat posts and/or connector systems disclosed herein can be implemented on other types of bicycles. For example, the example seat posts and/or connector systems disclosed herein may be used on road bicycles, as well as bicycles with mechanical (e.g., cable, hydraulic, pneumatic, etc.) and non-mechanical (e.g., wired, wireless) drive systems. Further, the example seat posts and/or connector systems disclosed herein can be implemented on non-electric assist bicycles. The example seat posts and/or connector systems disclosed herein can also be implemented on other types of two-wheeled, three-wheeled, and four-wheeled human powered vehicles. Further, the example seat posts and/or connector systems disclosed herein can be used on other types of vehicles, such as motorized vehicles (e.g., a motorcycle).

Figures 2, 3:
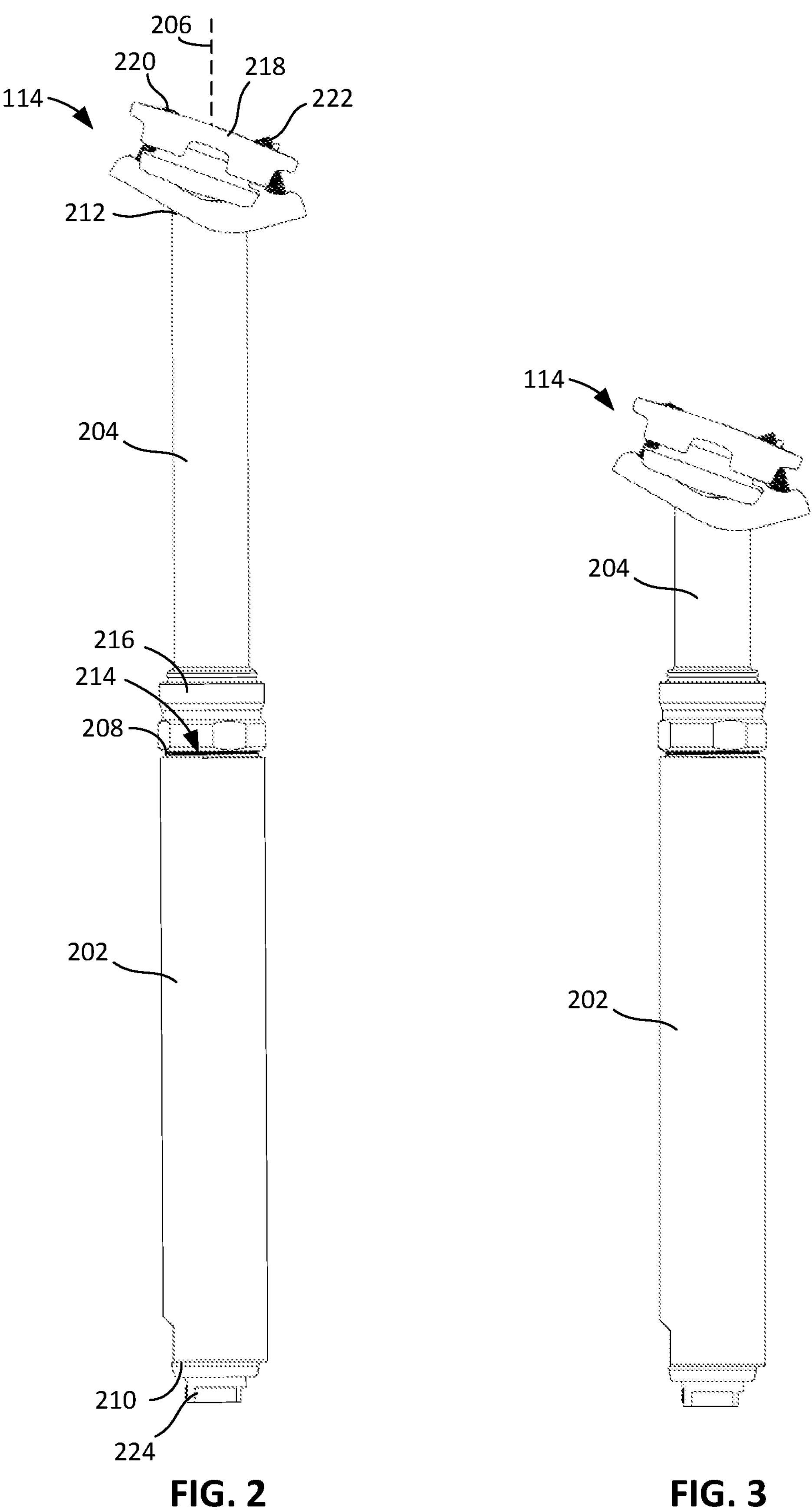
FIG. 2 is a side view of an example height adjustable seat post in a fully extended position.
FIG. 3 is a side view of the example height adjustable seat post of FIG. 2 in a partially contracted position.

FIGS. 2 and 3 are side views of the example height adjustable seat post 114 that can be implemented on the bicycle 100 of FIG. 1. FIG. 2 shows the seat post 114 in a fully extended position and FIG. 3 shows the seat post 114 in a partially contracted position. The seat post 114 can also be referred to as a dropper seat post or seat post assembly. The length or height of the example seat post 114 is adjustable so that the height of the seat 112 (FIG. 1) can be raised or lowered.

Referring to FIG. 2, the seat post 114 includes a first tube 202, referred to herein as a lower tube 202, and a second tube 204, referred to herein as an upper tube 204. The lower and upper tubes 202, 204 can also be referred to as seat post portions or segments. As shown in FIG. 2, the lower and upper tubes 202, 204 are configured in a coaxial arrangement and aligned along an axis 206. The axis 206 corresponds to a central or longitudinal axis of the seat post 114. The lower tube 202 has a first end 208, referred to herein as an upper end 208, and a second end 210, referred to herein as a lower end 210, opposite the upper end 208. The upper tube 204 similarly has a first end 212, referred to herein as an upper end 212, and a second end 400 (shown in FIGS. 4 and 5), referred to herein as a lower end 400, opposite the upper end 212. The upper tube 204 and the lower tube 202 are configured in a telescopic arrangement. In particular, in this example, the upper tube 204 extends into an opening 214 in the upper end 208 of the lower tube 202. As such, the upper tube 204 is at least partially disposed in the lower tube 202. The upper tube 204 is slidable into and out of the opening 214 in the lower tube 202, which enables the overall height or length of the seat post 114 to change. In other examples, the lower and upper tubes 202, 204 can be configured such that the lower tube 202 extends into the lower end 400 of the upper tube 204. In the illustrated example, the seat post 114 includes a collar 216 coupled to the upper end 208 of the lower tube 202. The collar 216 forms a seal around the upper tube 204 to prevent dirt and debris from entering the space between the upper and lower tubes 202, 204.

In the illustrated example, the seat post 114 includes a seat clamp 218 that is coupled (e.g., welded, bolted, threaded, etc.) to the upper end 212 of the upper tube 204. The seat clamp 218 is used to couple the seat 112 (FIG. 1) to the seat post 114. In this example, the seat clamp 218 includes two threaded fasteners 220, 222 (e.g., bolts) that can be tightened to secure the seat 112 to the upper tube 204. In other examples, the seat post 114 can include other mechanisms for attaching to the seat 112. In the illustrated example, the seat post 114 includes a base plate assembly 224 coupled to the lower end 210 of the lower tube 202. The base plate assembly 224 can include an electrical connector for connecting to a connector assembly for connecting the seat post 114 to the bicycle 100 (FIG. 1), as disclosed in further detail herein.

When the seat post 114 is installed on the bicycle 100 (FIG. 1), the lower tube 202 is coupled to the frame 102 (FIG. 1). For example, the lower tube 202 can be inserted into the seat tube 116 (FIG. 1) and secured by the clamp 118 (FIG. 1). The upper tube 204 extends upward from the lower tube 202 and supports the seat 112 (FIG. 1). As disclosed in further detail herein, the seat post 114 has an internal valve that enables the upper tube 204 to move (e.g., slide) downward relative to the lower tube 202 and provides rebounding force to move the upper tube 204 upward relative to the lower tube 202. This enables a rider to easily lower the height of the seat 112 or raise the height of the seat 112. The seat post 114 is adjustable between a fully extended position (sometimes referred to as a top-out position), shown in FIG. 2, and a fully contracted position in which the upper tube 204 is moved into the lower tube 202 until a stop or limit is reached. The seat post 114 can also be expanded/contracted to any position between the fully extended position and the fully contracted position and maintained in place. For example, FIG. 3 shows an example in which the upper tube 204 has been partially moved into the lower tube 202. As such, the seat 112 (FIG. 1) would be lowered or closer to the ground compared to the position in FIG. 2.

As an example operation, if a rider desires to lower the seat 112 (FIG. 1), the rider actuates a seat post actuator such as, in this example, the seat post actuation button 120 (FIG. 1). In FIG. 1 the seat post actuation button 120 is mounted on the handlebars 122 such that the rider can actuate the seat post actuation button 120 with one of his/her fingers (e.g., their thumb). Alternatively, the seat post actuation button 120 may be a lever or other type of user interface such a display device with a touch screen. When the seat post actuation button 120 is pressed, the seat post actuation button 120 transmits a signal (e.g., a wireless signal) to the drive unit 146 (FIG. 1). The drive unit 146 receives the signal from the seat post actuation button 120 and activates an internal actuator (e.g., a solenoid or motor) to open the internal valve, which is disposed in a pneumatic chamber in the upper tube 204, as disclosed in further detail herein. While the internal valve is open, the rider can push downward on the seat 112, which slides the upper tube 204 into the lower tube 202, as shown in the position of FIG. 3. In some examples, the rider can apply this force by sitting on the seat 112 and applying the downward force with their bottom. When the seat 112 reaches the desired height, the rider can release the seat post actuation button 120. In response, the drive unit 146 (FIG. 1) cuts off or ceases power to the internal valve, which causes the internal valve to close, and thereby maintains the upper tube 204 in place relative to the lower tube 202. When the rider desires to raise the seat 112, the rider can press the seat post actuation button 120 again. The drive unit 146 receives the signal and opens the internal valve. When little or no downward force is acting on the seat 112, the internal pneumatic system pushes the upper tube 204 upward from the lower tube 202, thereby moving the seat 112 upward. When the desired position is reached, the rider can release the seat post actuation button 120, which causes the internal valve to close and holds the seat post 114 in the current position. Therefore, the seat post height can be easily adjusted by the rider.

In some examples, to activate the internal valve, the rider pushes and holds the seat post actuation button 120. As long as the seat post actuation button 120 is depressed, the valve is held in the open state, which enables the upper tube 204 to slide upward or downward relative to the lower tube 202. When the rider releases the seat post actuation button 120, the interval valve is closed, which maintains the upper tube 204 in place. However, in other examples, the system can be configured such that the rider may press and release the seat post actuation button 120 to cause the valve to open, and then the rider presses the seat post actuation button 120 a second time to close the valve.

Figures 4, 5:
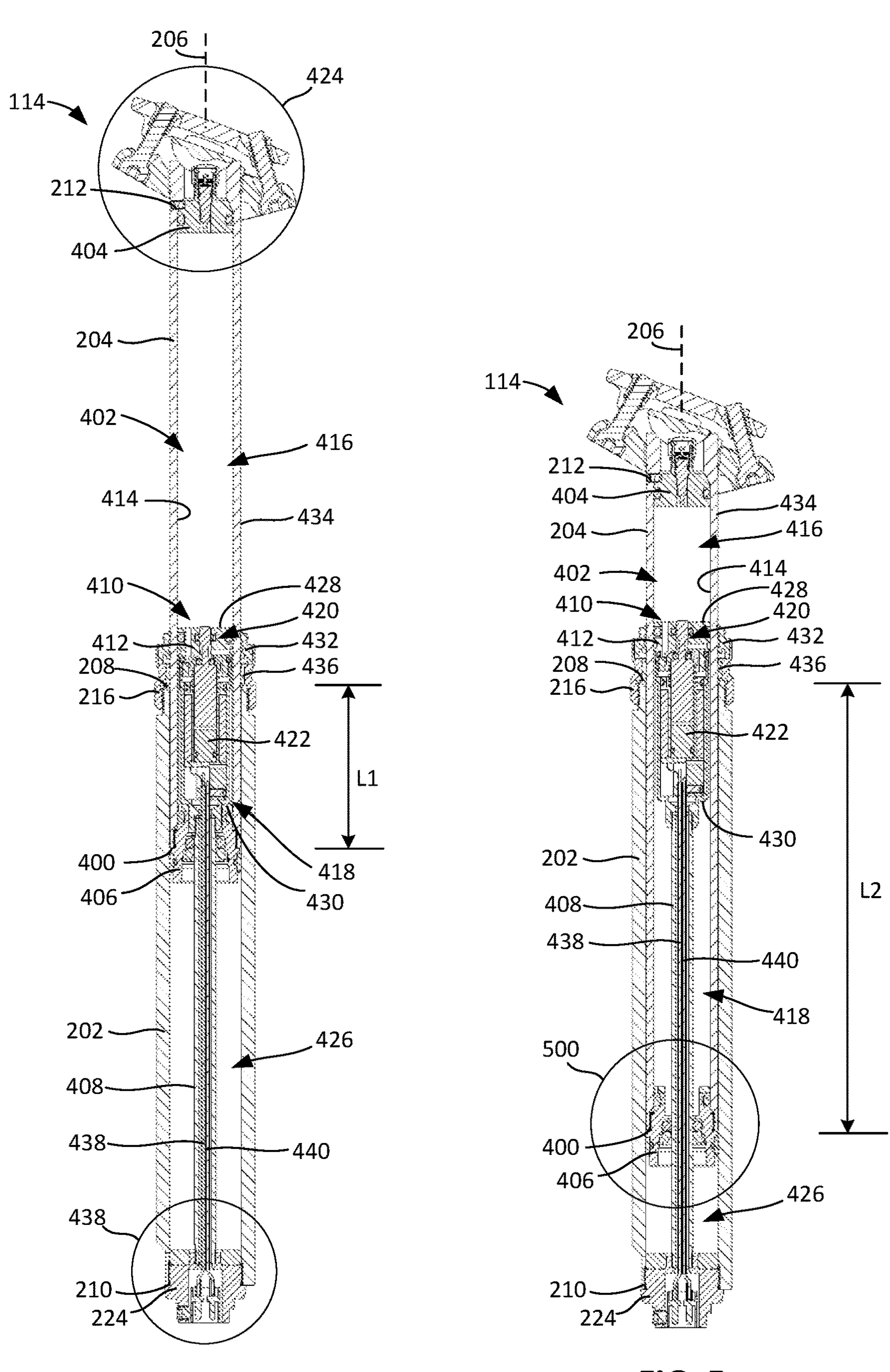
FIG. 4 is a cross-sectional view of the example height adjustable seat post of FIG. 2 in the fully extended position.
FIG. 5 is a cross-sectional view of the example height adjustable seat post of FIG. 3 in the partially contracted position.

FIG. 4 is a cross-sectional view of the seat post 114 in the fully extended position corresponding to FIG. 2, and FIG. 5 is a cross-sectional view of the seat post 114 in the partially contracted position corresponding to FIG. 3. FIGS. 4 and 5 are described together. As shown in FIGS. 4 and 5, the upper tube 204 has a lower end 400. The lower end 400 is disposed in the lower tube 202. As such, the lower and upper tubes 202, 204 overlap at an area or region of overlap. In FIG. 4, the lower and upper tubes 202, 204 overlap by a length L1, and in FIG. 5, the lower and upper tubes 202, 204 overlap by a length of L2, which is greater than L1. As such, the height or length of the seat post 114 in FIG. 5 is less than the height or length of the seat post 114 in FIG. 4.

As shown in FIGS. 4 and 5, the upper tube 204 defines a chamber 402. The chamber 402 is filled with pressurized fluid, such as a pneumatic gas (e.g., air, nitrogen). The seat post 114 includes an upper seal head 404 (e.g., an upper seal or bushing) coupled to the upper tube 204 and disposed in the upper tube 204 at or near the upper end 212. The seat post 114 also includes a lower seal head 406 (e.g., a lower seal or bushing) coupled to the upper tube 204 and disposed in the upper tube 204 at or near the lower end 400. The upper and lower seal heads 404, 406 seal the ends of the upper tube 204 to maintain the fluid in the chamber 402.

In the illustrated example of FIGS. 4 and 5, the seat post 114 includes a shaft 408, which may also be referred to as a rod. The shaft 408 is disposed in the lower tube 202 and coupled to the lower tube 202, such that the shaft 408 is fixed relative to the lower tube 202. In this example, the shaft 408 is coupled to the lower tube 202 at or near the lower end 210. The shaft 408 extends upward through the lower tube 202, through the lower seal head 406, and into the upper tube 204. In particular, the shaft 408 extends through the lower seal head 406 and into the chamber 402 defined in the upper tube 204. The lower seal head 406 is slidable up and down along the shaft 408 as the seat post 114 expands or contracts.

In the illustrated example of FIGS. 4 and 5, the seat post 114 includes a piston assembly 410 disposed in the upper tube 204. The piston assembly 410 may also be referred to as a valve assembly or flow control assembly. The piston assembly 410 is disposed in the chamber 402 of the upper tube 204 and is coupled (e.g., threadably coupled) to the shaft 408. Therefore, as the seat post 114 expands or contracts, the piston assembly 410 moves closer to or further away from the upper and lower ends 212, 400 of the upper tube 204. The piston assembly 410 includes a piston 412 that is sealed against an inner surface 414 of the upper tube 204. The inner surface 414 of the upper tube 204 is slidable up and down along the piston 412 as the seat post 114 expands or contracts. The piston assembly 410 and, in particular, the piston 412, divides the chamber 402 of the upper tube 204 into a first chamber 416 and a second chamber 418. The first chamber 416 is bound by the piston assembly 410, the upper seal head 404, and the upper tube 204. The second chamber 418 is bound by the piston assembly 410, the lower seal head 406, the upper tube 204, and the shaft 408. The volumes of the first and second chambers 416, 418 change as the upper tube 204 moves up and down relative to the piston assembly 410. The first and second chambers 416, 418 are filled with a fluid. In this example, the seat post 114 is based on a pneumatic platform. Therefore, the first and second chambers 416, 418 can be filled with a pressurized gas, such as nitrogen or air. In other examples the first and second chambers 416, 418 can be filled with another type of compressible gas. The piston assembly 410 controls the flow of fluid (e.g., pressurized gas) across the piston 412 and between the first and second chambers 416, 418.

In the illustrated example of FIGS. 4 and 5, the seat post 114 includes a valve 420 and an actuator 422 to operate the valve 420. In this example, the actuator 422 is implemented as a solenoid, referred to herein as the solenoid 422. However, in other examples, the actuator 422 could be implemented by a motor (e.g., a DC motor). In the illustrated example, the valve 420 and the solenoid 422 are incorporated into and/or integrated with the piston assembly 410. As such, the valve 420 and the solenoid 422 are disposed in the upper tube 204 and at least partially in a region of overlap (e.g., L1 or L2) between the upper tube 204 and the lower tube 202. In this example, the valve 420 is a type of poppet valve, which includes a plug or poppet that is movable in a linear direction to open or close the valve 420. However, in other examples, other types of valves can be used. The valve 420 can be operated (e.g., opened or closed) to control the fluid flow across the piston 412 between the first and second chambers 416, 418. In particular, the valve 420 is operable between a closed state in which the fluid is blocked from flowing across the piston 412 between the first and second chambers 416, 418, which maintains the lower and upper tubes 202, 204 in their current position, and an open state to enable the fluid to flow across the piston 412 between the first and second chambers 416, 418, which enables the upper tube 204 to move relative to the lower tube 202 for adjusting the height of the seat 112 (FIG. 1). The solenoid 422 controls the state of the valve 420, as disclosed in further detail herein.

Figure 6:
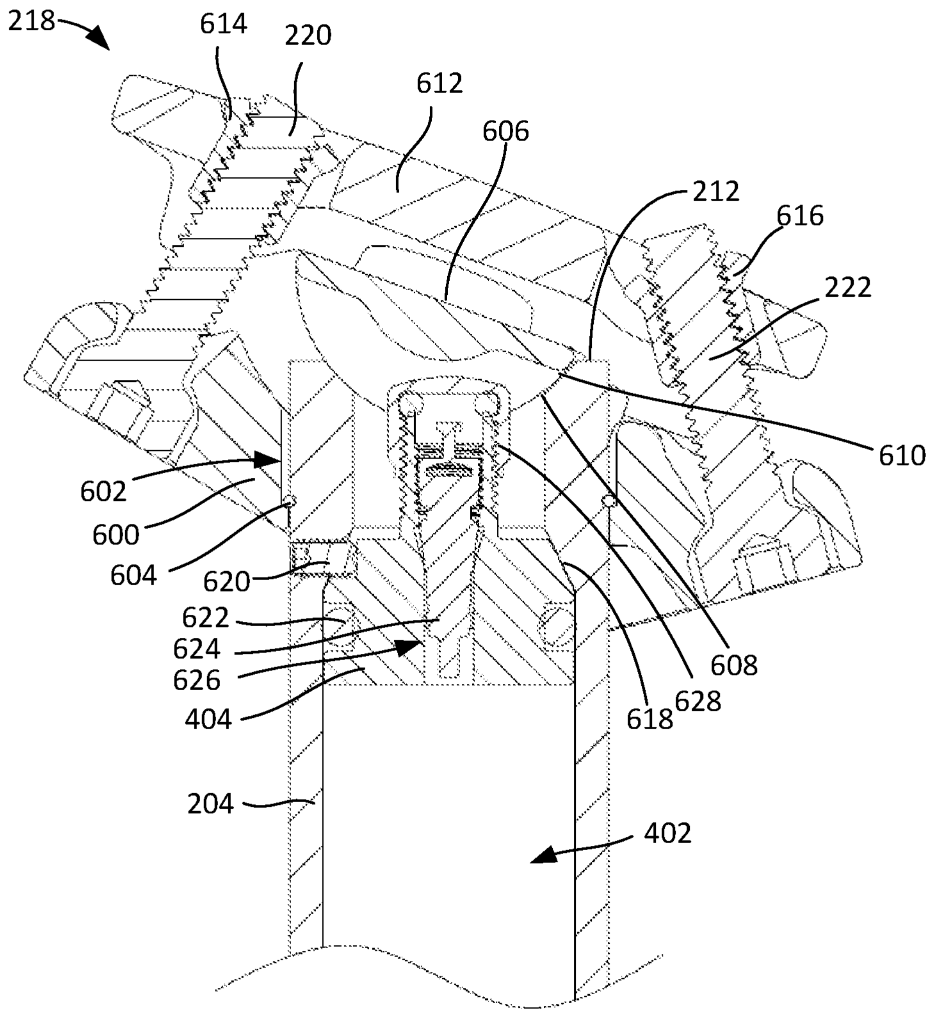
FIG. 6 is an enlarged view of the upper callout of FIG. 4 showing an example seat clamp and an example upper plug on an upper end of the example height adjustable seat post.

Referring briefly to FIG. 6, FIG. 6 is an enlarged view of the callout 424 of FIG. 4 showing the upper seal head 404 and the seat clamp 218 on the upper end 212 of the upper tube 204. The seat clamp 218 includes a head 600 that defines an opening 602 through which the upper end 212 of the upper tube 204 is inserted. A retaining clip 604 is used to prevent the head 600 from moving upwards relative to the upper tube 204. The seat clamp 218 includes a lower rail clamp 606 having a convex arcuately shaped bottom surface 608 that engages a complementary concave arcuately shaped top surface 610 of the upper tube 204. The seat clamp 218 includes an upper rail clamp 612 that is positioned above the lower rail clamp 606. Nuts 614, 616 are received in recesses in the upper rail clamp 612. The heads of the threaded fasteners 220, 222 are received in recesses in the head 600 and are threaded into the nuts 614, 616. The seat 112 (FIG. 1) has rail that can be positioned between the upper rail clamp 612 and the lower rail clamp 606. In order to position the seat 112 to the rider's preference, the rider may slide the rails of the seat 112 fore and aft and/or may rotate the lower rail clamp 606 about the center of its arcuately shaped bottom surface 608 to tilt the seat 112 up or down. Once the seat 112 is in the desired position, the rider can tighten the threaded fasteners 220, 222, causing the seat rails and the lower rail clamp 606 to be tightly clamped between the head 600 and the upper rail clamp 612.

As shown in FIG. 6, the upper seal head 404 is disposed in the upper tube 204 and abuts a shoulder 618 of the upper tube 204, which prevents the upper seal head 404 from moving further upward. A set screw 620 is threaded into the upper tube 204 and tightened against the upper seal head 404, which prevents the upper seal head 404 from rotating. A seal 622 (e.g., an O-ring) is received in a groove in the upper seal head 404 and prevents leakage of fluid out of the chamber 402.

In illustrated example FIG. 6, a valve 624 is disposed in an opening 626 extending through the upper seal head 404. The valve 624 enables a user to add or remove pneumatic fluid to/from the chamber 402 in the upper tube 204. In this example, the valve 624 is threaded into the opening 626. However, in other examples, the valve 624 can be coupled to the upper seal head 404 via other techniques. A valve cap 628 is threaded onto a top of the valve 624 to protect the valve 624 from dirt and other debris. A user can remove the seat clamp 218 and the valve cap 628 to access the valve 624 to add or remove fluid to/from the chamber 402. In this example, the valve 624 is implemented as a Schrader valve. However, in other examples, the valve 624 may be implemented as another type of valve, such as a Presta valve.

As an example operation of pressurizing the chamber 402, the seat clamp 218 and the valve cap 628 can be removed and an air pump can be attached to the top of the valve 624. As air is pumped into the chamber 402, the air first increases the pressure in the first chamber 416 (the positive chamber). To admit air into the second chamber 418 (the negative chamber) (FIG. 4), the rider may actuate the seat post actuation button 120 (FIG. 1) to open the valve 420 (FIG. 4). When the valve 420 is open, air flow from the first chamber 416 to the second chamber 418 until the pressures in the chambers 416, 418 equalize. The rider may repeat this process, pumping up the first chamber 416 and actuating the valve 420 to equalize the pressures in the first and second chambers 416, 418 until the final desired system pressure is achieved. In some examples, the seat post 114 is pressurized to a pressure in the range of 300-600 psi. However, in other examples, the seat post 114 can be pressurized to higher or lower pressures.

Referring to FIGS. 4 and 5, in the illustrated example, the first chamber 416 is a positive pressure chamber and the second chamber 418 is a negative pressure chamber. The first chamber 416 and the second chamber 418 are pressure sealed chambers. The lower tube 202 defines a third chamber 426 between the lower seal head 406 and the base plate assembly 224. The third chamber 426 is considered a pressure control chamber. The volume of the third chamber 426 changes based on the actuated position. In some examples, the third chamber 426 is vented to the atmosphere and therefore contains air at atmospheric pressure. However, in other examples, the third chamber 426 is also a pressure sealed chamber (e.g., containing pressurized air or nitrogen). In such an example, the air in the third chamber 426 may be compressed as the upper tube 204 is moved downward. This compressed air can provide a biasing force to return the seat post 114 to the fully extended position. In other examples, the third chamber 426 can have other mechanisms for compensating for the change in volume, such as a floating piston or a deformable bladder. The first chamber 416, the second chamber 418, and the third chamber 426 may be any number of shapes and/or sizes. For example, the first chamber 416, the second chamber 418, and the third chamber 426 may be cylindrically shaped (e.g., with outer diameters between 27 millimeters (mm) and 35 mm, respectively) and may be sized for a particular maximum post adjustment (e.g., 150 mm).

As shown in FIGS. 4 and 5, the piston 412 has a first side 428 facing the upper seal head 404 and a second side 430 opposite the first side 428 and facing the lower seal head 406. An axial surface area (as viewed along the axis 206) of the first side 428 of the piston 412 is greater than an axial surface area of the second side 430 of the piston 412. This is because a portion of the axial surface area of the second side 430 is reduced by the cross-sectional area of the shaft 408. When the valve 420 is in the closed state and the seat post 114 is in the fully extended position (FIG. 4), the first chamber 416 acts as a spring and is configured to bias the upper tube 204 towards the fully extended position of the seat post 114. The first side 428 and the second side 430 of the piston 412 are sized and shaped, and the first chamber 416 and the second chamber 418 are respectively pressurized when the seat post 114 is in the fully extended position, such that the gas within the first chamber 416 supports the weight of the rider. In some examples, the seat 112 (FIG. 1) sags less than 10 mm as a result of the weight of the rider on the seat 112 when the seat post 114 is in the fully extended position. The seat post 114 operates because the axial surface area of the first side 428 of the piston 412 versus a pneumatic pressure ratio between the first chamber 416 and the second chamber 418 holds up the rider based on a force calculation. This is also dependent on the volume of the second chamber 418 at the fully extended position of the seat post 114. When the seat post 114 is in the fully extended position as shown in FIG. 4, the volume of the first chamber 416 is greater than the volume of the second chamber 418. In some examples, the volume of the second chamber 418 may be no more than twenty percent of the volume of the first chamber 416 when the seat post 114 is in the fully extended position. In other examples, the first and second chambers 416, 418 may have a different volume ratio in the fully extended position. For example, the volume of the second chamber 418 may be no more than ten percent, five percent, or three percent of the volume of the first chamber 416 when the seat post 114 is in the fully extended position. This makes the seat post 114 act like a zero negative pressure preloaded pneumatic spring. This is the principal that holds up the rider with a feel the rider experiences as being rigid. At the fully extended position of the seat post 114, the seat 112 may move a small amount, but this movement is typically not perceivable to the rider.

As an example operation, assume the seat post 114 is in the fully extended position shown in FIG. 4 and the rider desires to lower the seat 112 (FIG. 1). The rider presses a seat post actuation button 120 (FIG. 1) on the handlebars 122 (FIG. 1), and the drive unit 146 (FIG. 1) activates the solenoid 422 to open the valve 420. When the valve 420 is open, a force can be applied downward on the seat 112 to compress the seat post 114. For example, the rider can sit (or partially sit) on the seat 112 to apply downward pressure with his/her bottom. This downward pressure forces fluid (e.g., pressurized gas) from the first chamber 416 to flow through the valve 420 and across the piston 412 and into the second chamber 418. This enables the upper tube 204 to move downward relative to the upper tube 204, thereby lowering the seat 112. As the upper tube 204 is moved downward, the volume of the first chamber 416 is reduced and the volume of the second chamber 418 is increased. The rider can move (e.g., lower) the seat 112 to any position between the fully extended position and a fully contracted position. FIG. 5 shows the seat post 114 as in an intermediate position between the fully extended position and the fully contracted position.

When the seat 112 is at a desired position, such as the position in FIG. 5, the rider can release the seat post actuation button 120 (FIG. 1). The drive unit 146 deactivates the solenoid 422, which closes the valve 420. When the valve 420 is closed, the fluid (e.g., pressurized gas) is prevented from flowing across the piston assembly 410 between the first chamber 416 and the second chamber 418. This limits or prevents further relative movement of the upper tube 204 relative to the lower tube 202. When the valve 420 is closed, the balance of forces in the system is such that the axial pressure force acting on the first side 428 of the piston 412 is approximately equal to the axial pressure force acting on the second side 430 of the piston 412. Using a compressible fluid such as air enables the pressure chamber to act as a compression spring when a downward force is applied on the upper tube 204. Therefore, when the rider sits on the seat 112, the seat post 114 can support the weight of the rider. In some examples, when the seat post 114 is in an intermediate position (between the fully extended position and the fully contracted position), the seat 112 may sag a small amount (e.g., 40 mm or less) because of the weight of the rider. The seat post 114 can be maintained at any position between the fully extended position and the fully contracted position. If the seat post 114 is moved to the fully contracted position, the collar 216 on the lower tube 202 may contact the seat clamp 218 and/or the lower seal head 406 may contact the base plate assembly 224 on the lower end 210 of the lower tube 202. This provides a hard stop to prevent further movement. When the seat post 114 is in the fully contracted position, the seat 112 may not sag due to this hard stop. In some examples, when the seat post 114 is in the fully expanded position (FIG. 4), the piston 412 is engaged with a top of the lower seal head 406. This forms a limit or stop that prevents the upper tube 204 from moving any further upward relative to the lower tube 202.

When it is desired to raise the seat post 114 back to the fully extended position, the rider presses on the seat post actuation button 120 (FIG. 1), and the drive unit 146 (FIG. 1) activates the solenoid 422 to open the valve 420. With no external downward force acting on the seat 112 (FIG. 1), the pressure in the first chamber 416 the upper tube 204 causes the upper tube 204 to move upward relative to the lower tube 202 back to the fully extended position. This is because the axial surface area of the first side 428 of the piston 412 is greater than the axial surface area on the second side 430 of the piston 412. As such, the force of the pressure in the first chamber 416 acting on the first side 428 of the piston 412 is larger than the force from the pressure in the second chamber 418 acting on the second side 430 of the piston 412. As a result, the upper tube 204 is forced upward to the fully extended position. As the upper tube 204 moves upward, fluid flows across the valve 420 from the second chamber 418 to the first chamber 416. Therefore, the axial pressure force imbalance biases the seat post 114 towards the fully extended position. This enables the seat post 114 to automatically expand back to the fully extended position shown in FIG. 4. When the seat post 114 is fully extended, the rider can release the seat post actuation button 120, which deactivates the solenoid 422 to close the valve 420 and thereby maintain the seat post 114 in the fully extended position. Therefore, the pressurized gas in the first chamber 416 biases the upper and lower tubes 204, 202 away from each other, and the pressurized gas in the second chamber 418 biases the upper and lower tubes 204, 202 toward each other.

As disclosed above, in some examples, the third chamber 426 is vented to the atmosphere. As such, the third chamber 426 provides minimal, if any, biasing force on the upper tube 204. However, in other examples, the third chamber 426 can be sealed and pressurized with a positive pressure. In such an example, when the upper tube 204 is moved downward, the volume of the third chamber 426 is reduced, which increases the pressure in the third chamber 426. This pressure acts upward on the lower seal head 406 to help bias the upper tube 204 to the fully extended position.

Figure 7:
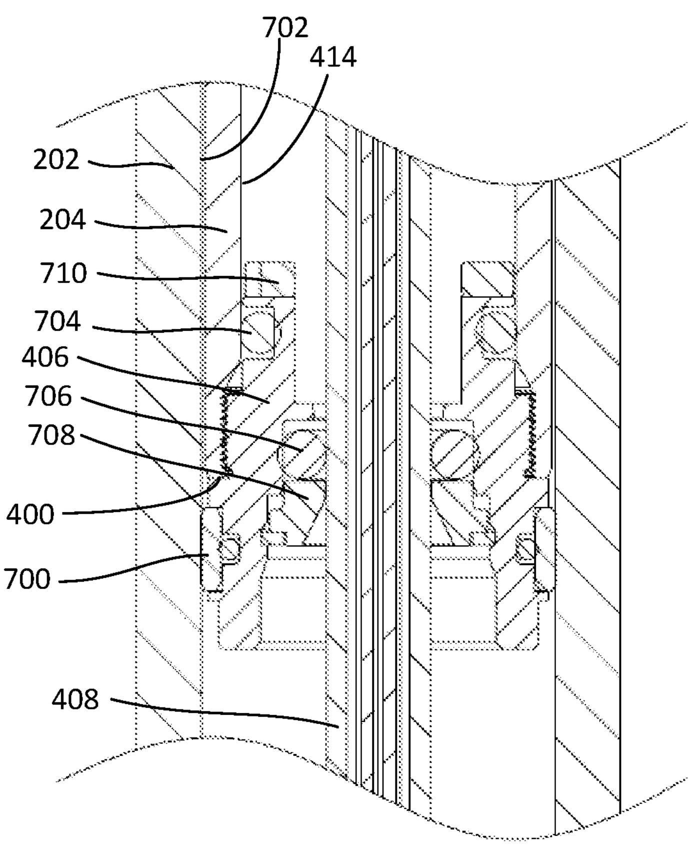
FIG. 7 is an enlarged view of the lower callout of FIG. 5 showing an example lower plug-in lower end of an example upper tube of the example height adjustable seat post.

Referring briefly to FIG. 7, FIG. 7 is an enlarged view of the callout 500 of FIG. 5 showing the lower seal head 406. As shown in FIG. 7, the lower seal head 406 is threadably coupled to the lower end 400 of the upper tube 204, which seals the lower end 400 of the upper tube 204. The seat post 114 includes a lower bushing 700 in a groove in the lower seal head 406, which is slidably engaged with an inner surface 702 of the lower tube 202. As the upper tube 204 telescopes relative to the lower tube 202, the upper tube 204 is radially supported by the lower bushing 700. A static seal 704 (e.g., an O-ring) is disposed in a groove in the lower seal head 406, which forms a seal between the lower seal head 406 and the inner surface 414 of the upper tube 204. The seat post 114 includes a shaft seal 706 disposed in a bore of the lower seal head 406, and which forms a seal between the lower seal head 406 and the shaft 408 to prevent leakage through the lower seal head 406. The shaft seal 706 also enables the lower seal head 406 to slide smoothly up and down along the shaft 408 as the seat post 114 expands and contracts. A retainer 708 is disposed adjacent the shaft seal 706 to maintain the shaft seal 706 in place. In the illustrated example, a rubber bumper 710 is positioned on a top surface of the lower seal head 406, which may be contacted by the piston 412 (FIG. 4) in the fully expanded position. In other examples, the seat post 114 can include more or fewer seals and/or the seals can be arranged in other configurations.

Referring back to FIGS. 4 and 5, the collar 216 is threadably coupled to the upper end 208 of the lower tube 202. The seat post 114 includes a dust seal 432 that is disposed in a recess in the collar 216 and contacts an outer surface 434 of the upper tube 204. The dust seal 432 prevents or limits dust and other debris from entering the area between the lower tube 202 and the upper tube 204. An upper bushing 436 is received in a recess in the collar 216, and slidingly supports the upper tube 204 supported by the upper bushing 436.

As disclosed above, the seat post 114 includes the solenoid 422 to operate the valve 420. The seat post 114 can include one or more wires and/or connectors to form an electrical path to supply power to activate the solenoid 422, which is disposed in the chamber 402 of the upper tube 204. For example, in FIGS. 4 and 5, the seat post 114 includes first and second wires 438, 440. In the illustrated example, the first and second wires 438, 440 are disposed in and extend through the shaft 408. In particular, the first and second wires 438, 440 extend through the shaft 408 between the solenoid 422, which is in the piston assembly 410, and the base plate assembly 224 on the bottom of the seat post 114. The first and second wires 438, 440 are connected to an electrical connector on the base plate assembly 224, which can be connected to an electrical supply, as disclosed in further detail herein. In some examples, the first and second wires 438, 440 are positive and negative wires. In some examples, each of the wires 438, 440 has an insulated sheath. In other examples, the wires 438, 440 may be sheathed together.

Figure 8:
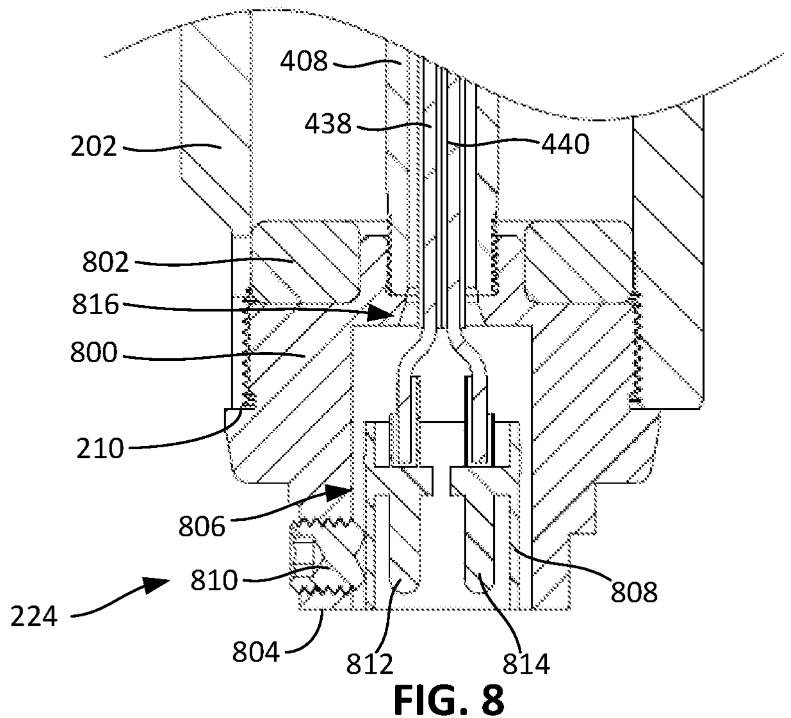
FIG. 8 is an enlarged view of the lower callout of FIG. 4 showing an example base plate assembly in a bottom of the example seat post.

FIG. 8 is an enlarged view of the callout 438 of FIG. 4 showing the base plate assembly 224. The base plate assembly 224 includes a base plate 800 that is threadably coupled (e.g., screwed into) the lower end 210 of the lower tube 202. The shaft 408 is coupled to and extends upward from the base plate 800. As such, the shaft 408 is coupled to and remains in a fixed position relative to the lower tube 202. In this example, the shaft 408 is threadably coupled to the base plate 800. However, in other examples, the shaft 408 can be coupled to the base plate 800 via other techniques (e.g., threaded fasteners, an adhesive, etc.). The base plate assembly 224 has a foam ring 802 on a top of the base plate 800.

As shown in FIG. 8, the base plate 800 has a bottom end 804 with a bore 806 extending into the bottom end 804. The base plate assembly 224 includes an electrical connector 808 (e.g., a receptacle or jack), which is disposed in the bore 806. The first and second wires 438, 440 are connected to the connector 808. In this example, the connector 808 has first and second pins 812, 814 and may therefore be referred to as a two-pin connector. The first and second wires 438, 440 extend into the bore 806 and are electrically connected (e.g., via soldering) to first and second pins 812, 814, respectively, of the connector 808. In this example, the connector 808 is held in place via a set screw 810, which also provides strain relief to the first and second wires 438, 440. In other examples, the connector 808 can be held in the bore 806 via other techniques. In this example, the pins 812, 814 are recessed or set back from the bottom end 804 of the base plate 800, which helps to protect the pins 812, 814 from damage. However, in other examples, the pins 812, 814 may extend outward or beyond the bottom end 804. The connector 808 can be connected to a power source that can supply power to the first and second wires 438, 440 to activate the solenoid 422 (FIG. 4) and control the valve 420 (FIG. 4), as disclosed in further detail herein. In the illustrated example, the first and second wires 438, 440 extend through a channel 816 in the base plate 800. The inside of the shaft 408 is vented to the atmosphere via the bore 806 and the channel 816. Therefore, the inside of the shaft 408 may be at atmospheric pressure. While in this example the connector 808 is on the lower end 210 of the lower tube 202, in other examples, the connector 808 can be disposed in another location.

Figure 9:
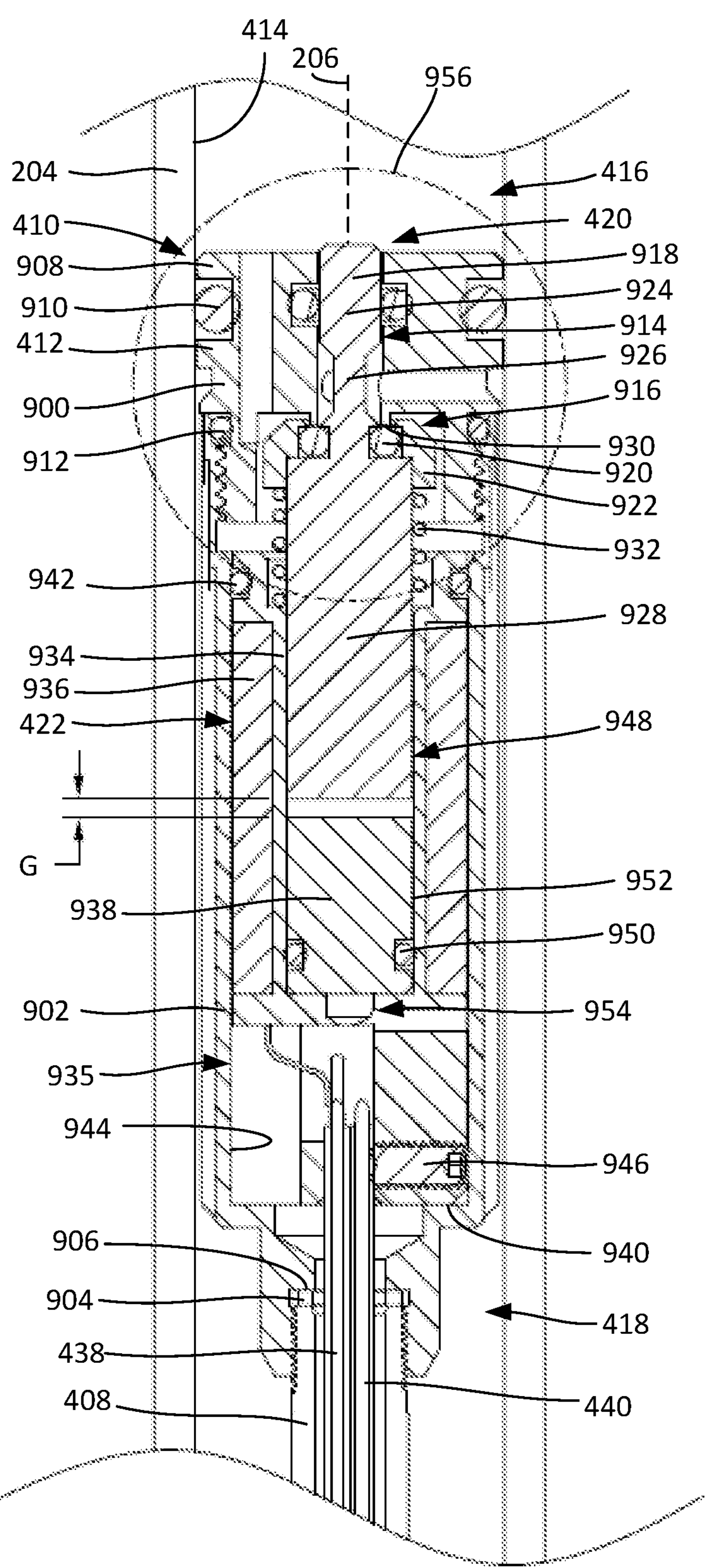
FIG. 9 is an enlarged view of the middle callout of FIG. 5 showing a cross-sectional view of an example piston assembly with an example valve in a closed state.

FIG. 9 is an enlarged cross-sectional view of the piston assembly 410 in the upper tube 204. The piston assembly 410 includes the piston 412. The piston 412 is threadably coupled to the shaft 408. The piston 412 can be formed by one or more body portions that are coupled together. In the illustrated example, the piston 412 includes a first body portion 900 and a second body portion 902 that is coupled to the first body portion 900. In this example, the first and second body portions 900, 902 are threadably coupled, but can be coupled via other techniques in other examples. In this example, the first body portion 900 includes and/or otherwise forms the valve 420, and the second body portion 902 contains the solenoid 422. Therefore, the first body portion 900 may be referred to as a valve body, and the second body portion 902 may be referred to as a solenoid housing. The shaft 408 is threaded into the second body portion 902. In the illustrated example, the piston assembly 410 includes a seal 904 (e.g., a brass crush washer) between the shaft 408 and a shoulder 906 in the second body portion 902. The seal 904 provides a sealing interface between the shaft 408 and the second body portion 902 to prevent or limit leakage of the fluid between the second chamber 418 and inside of the piston 412.

In the illustrated example, the first body portion 900 has or forms a head portion 908 that is sealed against the inner surface 414 of the upper tube 204. In particular, in this example, the piston assembly 410 includes a seal 910 (e.g., an O-ring), which may be referred to as a chamber seal or piston seal, around the head portion 908 to seal against the inner surface 414 of the upper tube 204. As such, the piston 412 divides the chamber 402 of the upper tube 204 into the first chamber 416 (formed above the head portion 908) and the second chamber 418 (formed below the head portion 908). In the illustrated example, the piston assembly 410 includes a static seal 912 (e.g., an O-ring) disposed between the first and second body portions 900, 902, which helps fluidly separate the fluid pressure on the outside of the piston 412 from the fluid pressure inside of the piston 412. In some examples, the first and second body portions 900, 902 are constructed of the same material, such as a metal (e.g., steel, aluminum, etc.). In other examples, the first and second body portions 900, 902 are constructed of different materials. For example, in some instances, the first body portion 900 is constructed of aluminum, and the second body portion 902 is constructed of a ferromagnetic material, such as steel.

In the illustrated example, the first body portion 900 of the piston 412 defines a central channel 914 (e.g., a bore, a passageway, etc.). The central channel 914 forms a portion of a fluid passageway across the head portion 908 that fluidly connects the first chamber 416 and the second chamber 418, as disclosed in further detail herein. In the illustrated example, the valve 420 includes a plug assembly 916 (which may also be referred to as a plunger assembly or poppet assembly). A portion of the plug assembly 916 is slidably disposed in the central channel 914. The plug assembly 916 is moveable in a linear direction (up and down in FIG. 9) between a closed position and an open position. In the illustrated example, the plug assembly 916 is aligned with and moveable along the axis 206. The valve 420 is formed by the piston 412 and the plug assembly 916. As disclosed above, the valve 420 is operable between a closed state to block fluid flow across the piston 412 and an open state to allow fluid flow across the piston 412. When the plug assembly 916 is the closed position, which is shown in FIG. 9, the plug assembly 916 blocks fluid flow through the central channel 914 and across the piston 412. As such, fluid is prevented from flowing across the piston 412 between the first and second chambers 416, 418. In the open position, the plug assembly 916 is moved to a position that enables or allows fluid flow through the central channel 914 and across the piston 412 between the first and second chambers 416, 418.

In the illustrated example, the plug assembly 916 includes a plug 918, a seal 920, and a seal retainer 922. The plug 918 may also be referred to as a plunger or poppet. The plug 918 is controlled by the solenoid 422 to move linearly up and down to open or close the valve 420, as disclosed in further detail herein. The seal 920 is carried by the plug 918. As such, the seal 920 moves with the plug 918 up and down in the piston 412. In this example, the seal 920 is at least partially coupled to the plug 918 via the seal retainer 922. However, in other examples, the seal 920 can be coupled to the plug 918 via other mechanisms. In the illustrated example, the plug 918 has a first portion 928, a second plug portion 926, and a third plug portion 924. The second plug portion 926 extends between the first plug portion 928 and the third plug portion 924. The first plug portion 928 has a greater diameter than the second and third plug portions 926, 924. The second plug portion 926 has a smaller diameter than the third plug portion 924. The seal 920 is disposed around the second plug portion 926. In some examples, the seal 920 is constructed of an elastomeric material. In some examples, the seal 920 is an O-ring, such as an O-ring constructed of nitrile rubber (also referred to as NRB or Buna-N). However, in other examples, the seal 920 can be implemented by another type of seal and/or constructed of other materials. For example, the seal 920 may be a layer of rubber that is molded over a portion of the plug 918. When the plug 918 is in the closed position shown in FIG. 9, the seal 920 is engaged with a shoulder 930 (which may be referred to as a seat) of the first body portion 900 of the piston 412. As such, this sealing interface blocks or prevents fluid flow through the central channel 914 and between the first and second chambers 416, 418. The piston assembly 410 includes a spring 932 (e.g., a compression spring) that biases the plug assembly 916 in the upward direction, which corresponds to the closed position of the valve 420. As such, the seal 920 is firmly pressed against the shoulder 930, thereby forming a seal to block or prevent fluid flow. In the illustrated example, the spring 932 is disposed between the seal retainer 922 and a bobbin 934 of the solenoid 422. However, in other examples, the spring 932 can be disposed in other locations.

In the illustrated example, the piston 412 defines an interior cavity 935 in the second body portion 902. The solenoid 422 is disposed in the interior cavity 935. The solenoid 422 includes the bobbin 934, a coil 936 (e.g., copper wire windings) wrapped around the bobbin 934, and a core 938 (which may also be referred to as a pole piece). In this example, the armature portion 928 of the plug 918 acts as the armature of the solenoid 422. However, in other examples, the solenoid 422 may include a separate armature that is coupled (e.g., threadably coupled, coupled via a bolt, coupled via interference fit, etc.) to the plug 918. In some examples, the bobbin 934 is constructed of anodized aluminum. In other examples, the bobbin 934 can be constructed of other materials. In some examples, the coil 936 can be constructed of 30 AWG insulated cooper wire. However, in other examples, the coil 936 can be constructed of other material. The coil 936 can include any number of turns or loops. In some examples, the coil 936 has 850 turns. In some examples, the total electrical resistance of the wire windings is 11.1 Ohms. Therefore, when a 36-volt power source is applied to the coil 936, the current flowing through the coil 936 is approximately 3.24 amperes, and the magnetomotive force generated by the coil 936 is approximately 2750 ampere-turns (or amp-turns). However, in other examples the coil 936 can include more or fewer turns than 850 and/or the resistance may be greater or less than 11.1 Ohms. In the illustrated example, the bobbin 934 is disposed in the second body portion 902 and engaged with a shoulder 940 near the bottom of the second body portion 902. The piston assembly 410 includes a static seal 942 (e.g., an O-ring) that is disposed in a recess of an upper portion of the bobbin 934 and seals against an inner surface 944 of the second body portion 902.

As shown in FIG. 9, the first and second wires 438, 440 extend through the shaft 408 and into the lower portion of the interior cavity 935 of the piston 412. The first and second wires 438, 440 are electrically coupled to the solenoid 422. In particular, the first and second wires 438, 440 extend through a bottom of the bobbin 934 and are electrically connected to the coil 936. In some examples, the first and second wires 438, 440 may be electrically connected to opposite ends of the coil 936, such as via soldering. In the illustrated example, a set screw 946 is threaded into the bobbin 934 and is tightened against the first and second wires 438, 440 to provide strain relief.

In the illustrated example, the bobbin 934 defines a bore 948. The core 938 is disposed in the bore 948 of the bobbin 934 (near the bottom). The solenoid 422 includes a seal 950 between the core 938 and an inner surface 952 of the bobbin 934. In some examples, the core 938 is constructed of a ferromagnetic material, such as steel. A bottom of the bobbin 934 has a vent channel 954 below the core 938, which vents or allows air to escape from below the core 938 when the core 938 is inserted into the bore 948 of the bobbin 934 during assembly. The armature portion 928 of the plug 918 is slidably disposed in the bore 948 of the bobbin 934. When the plug 918 is in the closed position shown in FIG. 9, the armature portion 928 of the plug 918 is spaced from the core 938 by a gap G. In some examples, the gap G is about 1.2 mm. In other examples, the gap G can be larger or smaller depending on the relative sizes and configuration of the parts of the piston assembly 410. When the solenoid 422 is activated, the armature portion 928 is moved downward and contacts the core 938, as shown in further detail in connection with FIG. 11.

Figure 10:
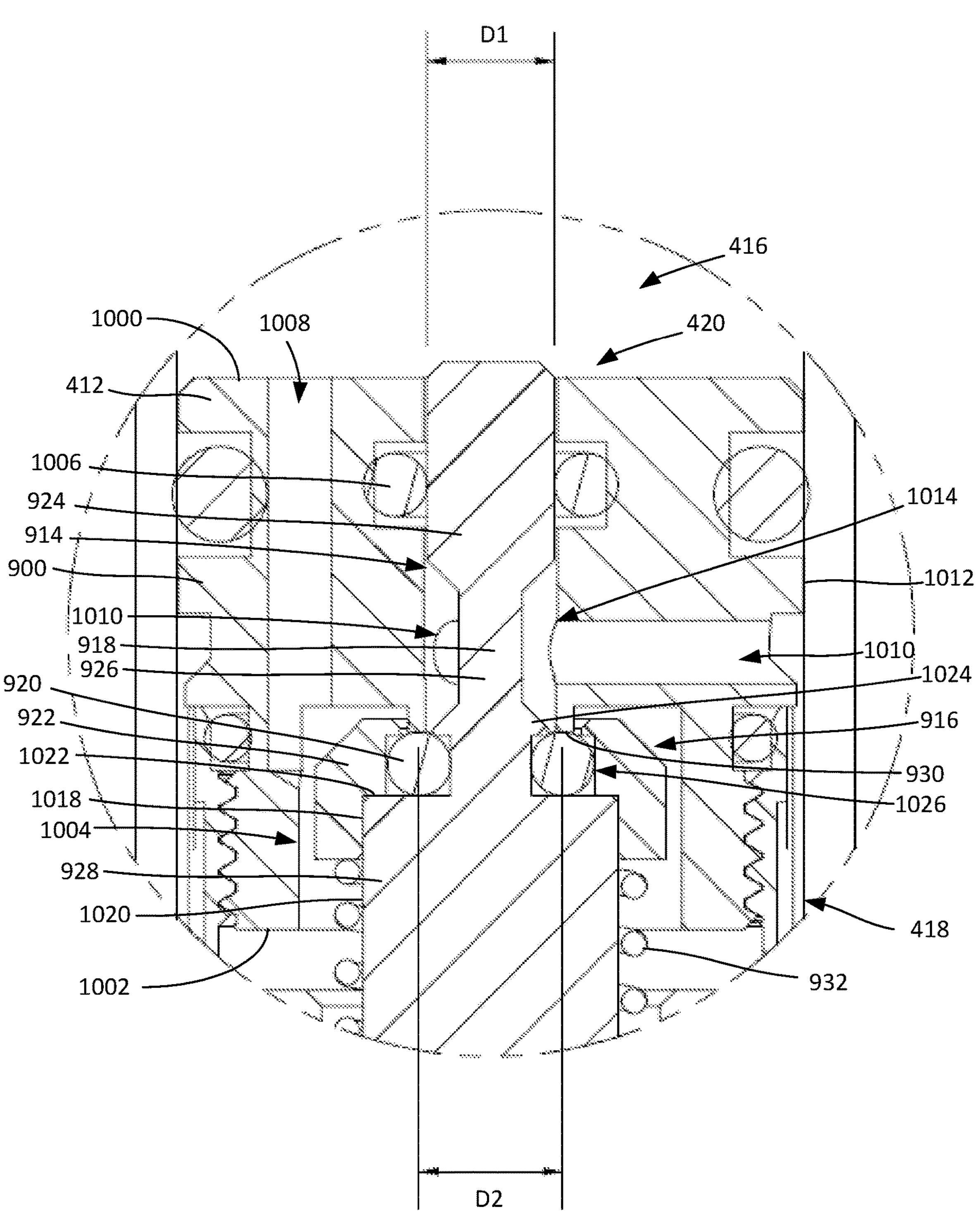
FIG. 10 is an enlarged view of the callout of FIG. 9 showing the example valve.

FIG. 10 is an enlarged view of the callout 956 of FIG. 9, showing the plug assembly 916 in the closed position, which corresponds to the closed state of the valve 420. The first body portion 900 of the piston 412 has a first side 1000 and a second side 1002 opposite the first side 1000. The first body portion 900 defines a cavity or bore 1004 extending into the second side 1002. The central channel 914 extends between the first side 1000 and the bore 1004. As shown in FIG. 10, the valve 420 includes a seal 1006 in the central channel 914 and engaged with the third plug portion 924 of the plug 918. This prevents fluid leaking through the central channel 914 past the third plug portion 924. The first body portion 900 of the piston 412 defines a plurality of axial channels 1008 (one of which is shown in FIG. 10) that extend between the first side 1000 and the bore 1004 on the second side 1002. The axial channels 1008 are parallel to and separate from the central channel 914. As such, the axial channels 1008 and the bore 1004 in the first body portion 900 are in fluid communication with the fluid in the first chamber 416. In the illustrated example, the first body portion 900 has a plurality of radial channels 1010 (two of which are shown and labeled in FIG. 10) that extend radially between the central channel 914 and an outer surface 1012 of the piston 412. As such, the radial channels 1012 and a portion of the central channel 914 (below the seal 1006) are in fluid communication with the fluid in the second chamber 418. Therefore, the axial channels 1008, the bore 1004, the central channel 914, and the radial channels 1010 form a fluid passageway 1014 across the piston 412 and between the first and second chambers 416, 418. In other words, the piston 412 defines the fluid passageway 1014 between the first and second chambers 416, 418. In FIG. 10, the piston assembly 916 is in the closed (upward) position, which blocks fluid flow through the fluid passageway 1014 and between the first and second chambers 416, 418. The piston assembly 916 can be moved to the open (downward) position to enable or allow fluid flow through the fluid passageway 1014 between the first and second chambers 416, 418, as disclosed in further detail herein.

In the illustrated example, the seal retainer 922 has a central channel 1016 with a plurality of shoulders. The seal retainer 922 is coupled to plug 918 and, in particular, to the armature portion 928 of the plug 918. In this example, an inner surface 1018 of the seal retainer 922 is engaged with an outer surface 1020 of the plug 918 via an interference fit (sometimes referred to as a friction fit or press fit). In other examples, the seal retainer 922 can be coupled the plug 918 via other techniques (e.g., via threaded fasteners, an adhesive, etc.). The second plug portion 926 extends from a top side 1022 of the armature portion 928. The seal 920 is disposed around the second plug portion 926 and is engaged with the top side 1022 of the first plug portion 928. In the illustrated example, the second plug portion 926 of the plug 918 has a radially extending flange 1024. The seal 920 is captured (e.g., axially) between the flange 1024 and the first plug portion 928. Further, as shown in FIG. 10, the seal 920 is captured in a space 1026 defined between the seal retainer 922, the second plug portion 924 (and the flange 1024), and the first plug portion 928. This configuration securely holds the seal 920 and prevents or limits seal extrusion or deformation as seen in known seat post valves.

As shown in FIG. 10, when the solenoid 422 (FIGS. 4 and 9) is not activated, the plug assembly 916 biased upward by the spring 932 such that the seal 920 is engaged with the shoulder 930 of the piston 412. This prevents or blocks fluid from flowing between the central channel 914 (which is in fluid communication with the second chamber 418 via the radial channels 1010) and the bore 1004 (which is in fluid communication with the first chamber 416 via the axial channels 1008). As such, when the valve 420 is in the closed position, the valve 420 blocks communication between the first and second chambers 416, 418 (the positive and negative pressure chambers) to lock the upper tube 204 and the lower tube 202 in position relative to each other. In the illustrated example, the shoulder 930 is a ring-shaped protrusion extending (downward) from a surface of the piston 412. When the plug assembly 916 is in the closed position shown in FIG. 11, the shoulder 930 extends through a gap between the seal retainer 922 and the second plug portion 926 of the plug 918 to engage the seal 920. In this position, the seal 920 is axially clamped between the shoulder 930 and the first plug portion 928. This axial clamping forms a tight sealing interface.

Figure 11:
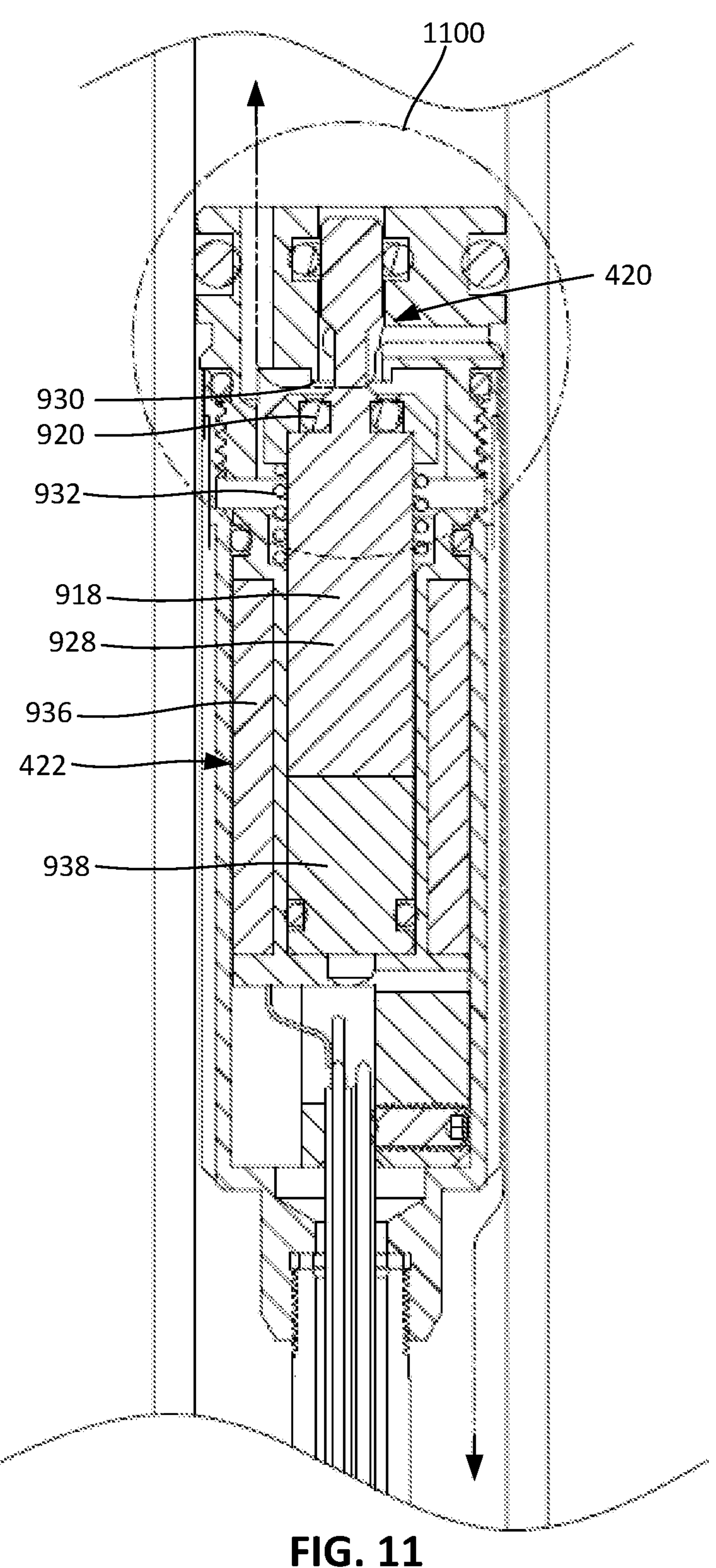
FIG. 11 is the same cross-sectional view as FIG. 9 showing the example valve in an open state.

FIG. 11 is a same cross-sectional view as FIG. 9 showing the valve 420 in the open state. When it is desired to open the valve 420, the rider can press the seat post actuation button 120 (FIG. 1), which sends a signal to the drive unit 146 (FIG. 1). The drive unit 146 supplies electrical power (from the battery) to the coil 936 of the solenoid 422. The first plug portion 928 functions as an armature. The electrical energy in the coil 936 creates a magnetic field that acts on the first plug portion 928 of the plug 918 and causes the plug 918 to move downward toward the core 938. The plug 918 is moved downward, as shown in FIG. 11, until the gap G is closed and the first plug portion 928 makes contact with the core 938. This downward movement compresses the spring 932 and moves the seal 920 away from the shoulder 930.

Figure 12:
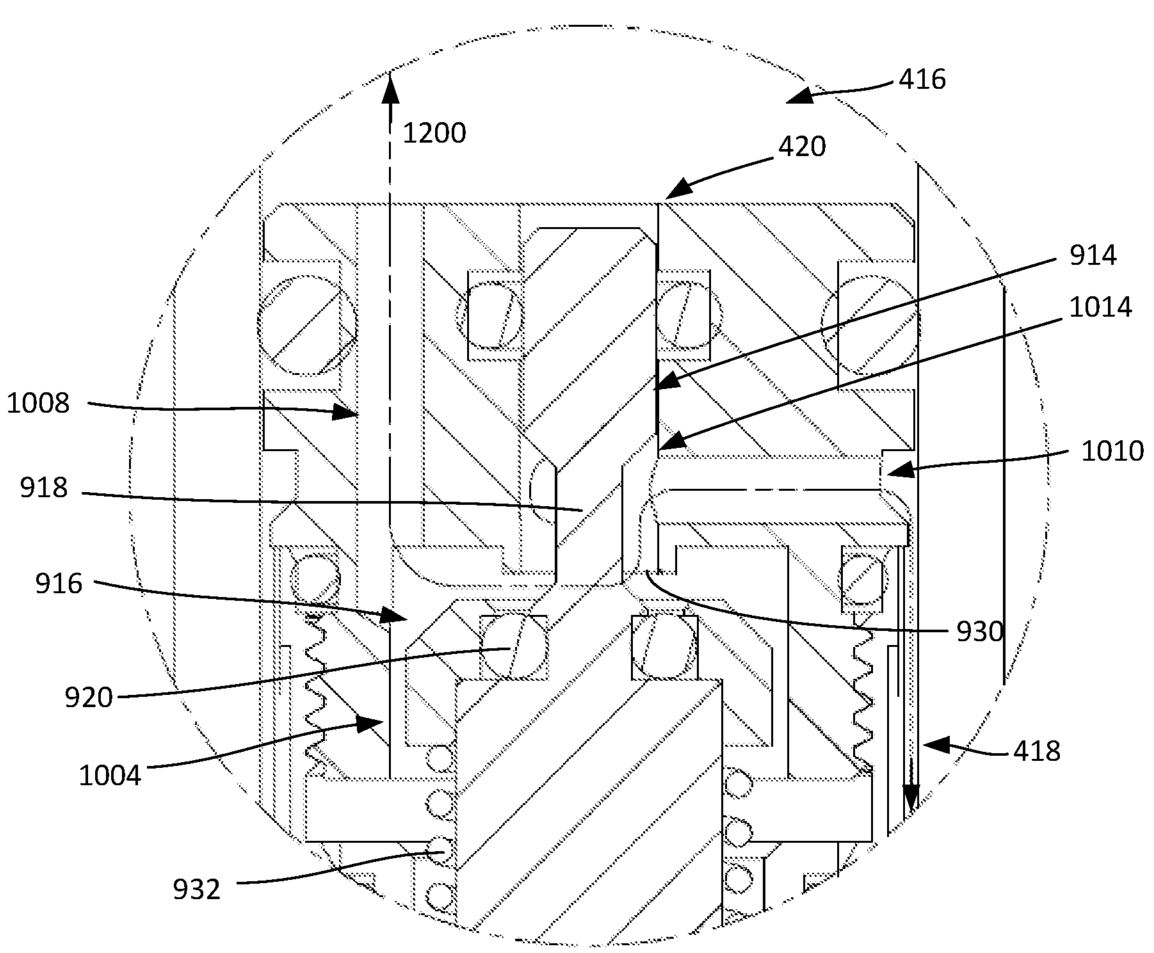
FIG. 12 is an enlarged view of the callout of FIG. 11 showing the example valve.

FIG. 12 is an enlarged view of the callout 1100 of FIG. 12. As shown in FIG. 12, when the plug 918 of the plug assembly 916 is in the open position, the seal 920 is spaced from the shoulder 930. Therefore, as shown by the fluid flow lines 1200, fluid can flow through the fluid passageway 1014 between the first and second chambers 416, 418. For example, fluid can flow from the first chamber 416, through the axial channels 1008, through the bore 1004, through the shoulder 930, through the central channel 914, and through the radial channels 1010 to the second chamber 418 (or vice versa). As such, the valve 420 is open and allows fluid flow between the first and second chambers 416, 418 (the positive and negative pressure chambers). This allows the upper tube 204 (FIG. 2) to move relative to the lower tube 202 (FIG. 2)

to adjust the height of the seat 112 (FIG. 1). When it is desired to close the valve 420, the solenoid 422 is deactivated or shut off. Without the magnetic field, the spring 932 biases the plug 918 such that the seal 920 is engaged with the shoulder 930 and blocks fluid flow between the first and second chambers 416, 418, as shown in FIGS. 9 and 10. Therefore, when the solenoid 422 is activated, the plug assembly 916 is moved in a first direction (e.g., downward) to open the valve 420, and when the solenoid 422 is deactivated, the plug assembly 916 is moved in a second direction (e.g., upward) to close the valve 420.

In some examples, once electrical power is applied to the solenoid 422, it only takes a relatively short time (e.g., 5 milliseconds) for the plug 918 to close the gap G and contact the core 938. Once the plug 918 contacts the core 938, the magnetic force holding the plug 918 against the core 938 increases greatly and, thus, less electrical power is required to hold the plug 918 in contact with the core 938. Therefore, after a period of time, the drive unit 146 can reduce the power supplied to the solenoid 422 to maintain the plug 918 in the downward (open) position. For example, the drive unit 146 may reduce the power to about 25% of the original power value after approximately 10 milliseconds has elapsed. In some examples, power is applied to hold the plug 918 against the core 938 for as long as the rider holds the seat post actuation button 120. However, in some examples, the drive unit 146 may automatically cut off power after a designated length of time (e.g., 3 seconds) to prevent overheating of the solenoid 422.

Referring back to FIG. 10, when the valve 420 is closed, it can be seen that pressure from the first chamber 416 (the positive chamber) acts on the top and bottom of the plug 918, while pressure from the second chamber 418 (the negative chamber) acts on the surfaces of the plug 918 between the seal 1006 and the seal 920. The seal 1006 and the third plug portion 924 of the plug 918 form or define a first seal diameter D1, and the seal 920 and the shoulder 930 form or define a second seal diameter D2. In this example, the second seal diameter D2 is larger than the first seal diameter D1. An annular area A is defined by the diameters D2 and D1, the magnitude of which is equal to the area of a circle with diameter D2 minus the area of a circle with diameter D1. Therefore, the net force exerted on the plug 918 by the first chamber 416 pushes upwards on the plug 918 and is equal to the product of the pressure and the annular area A. In other words, pressure in the first chamber 416 biases the plug 918 to the closed position (corresponding to the closed state of the valve 420), and pressure in the second chamber 418 biases the plug 918 to the open position (corresponding to the open state of the valve 420). Because the diameters D1 and D2 are only slightly different from each other, the annular area A is relatively small, and therefore the forces produced by air pressures acting on the plug 918 are small and are usually less than the relatively large force exerted on the plug 918 by the spring 932. However, if an external upward force is exerted on the seat 112 (FIG. 1) (e.g., if the rider hangs the bike by the seat 112), the seat post 114 may extend slightly, decreasing the volume and increasing the pressure of the second chamber 418, and increasing the volume and decreasing the pressure of the first chamber 416. In extreme cases, the resulting net downward force exerted on the plug 918 by the pressure can overcome the biasing force of the spring 932, in which case the valve 420 may remain open and the seat post 114 extends. Therefore, the spring 932 can be sized appropriately so that reasonable upwards forces can be exerted on the seat 112 without extending the seat post 114.

Also, the pressure differential acting on the plug 918 creates a biasing force that reduces the energy required by the solenoid 422 to move the plug 918 and/or hold the plug 918 in the different states. For example, when the plug 918 is in the closed position (FIG. 1), a first biasing force acts on the plug 918 in the upward direction, and when the plug 918 is in the open position (FIG. 12), a second biasing force acts on the plug 918 in the upward direction, which is less than the first biasing force. In other words, the first biasing force on the plug 918 when the valve 420 is in the closed state is greater than the second biasing force on the plug 918 when the valve 420 is in the open state. Therefore, in some examples, the valve 420 can opened by applying a first (higher) electrical power to the solenoid 422 to initially open the valve 420, and then reducing the electrical power to second electrical power to maintain the valve 420 in the open position. As a result, less energy is required to hold the valve 420 in the open state. This reduces power consumption of the solenoid 422.

Referring back to FIG. 9, the inside of the shaft 408 is vented to the atmosphere. Therefore, the lower portion of the interior cavity 935 of the piston 412 is vented to the atmosphere and, thus, is at atmospheric pressure. The seal 942 separates the interior cavity 935 between an upper portion (e.g., above the seal 942) with the pressurized fluid and the lower portion (e.g., below the seal 942) that is at atmospheric pressure. As such, in this example, the wires 438, 440 and the coil 936 are at atmospheric pressure. Therefore, the wires 438, 440 and the coil 936 are not disposed in the pressurized area of the first and second chambers 416, 418 (the positive and negative chambers). As a result, the wires 438, 440 and/or the channels for the wires do not need to be sealed to prevent leakage from the chambers 416, 418 into the lower portion of the piston 412, which greatly reduces sealing requirements of the piston assembly 410. Also, the pressure of the air immediately above the core 938 is in communication with the first chamber 416 (the positive chamber). The vent channel 954 vents the bottom of the core 938 to the atmospheric pressure in the lower portion of the interior cavity 935, such that a pressure differential acting on the core 938 holds the core 938 in the bottom of the bore 948 of the bobbin 934. In particular, the pressure differential generates a net downward force on the core 938, thereby holding the core 938 firmly in place against the bottom of the bore 948 in the bobbin 934. As such, the core 938 does not need to be physically or mechanically coupled to the bobbin 934, which reduces assembly time and complexity. However, in other examples, the core 938 can be coupled to the bobbin 934 via threaded fasteners or other mechanical techniques.

While in this illustrated the seat post 114 includes two wires 438, 440, in other examples, the seat post 114 may include only one wire (e.g., only the first wire 438). In some such examples, the shaft 408 may be constructed of a conductive material (e.g., copper, steel, etc.). As such, the shaft 408 may operate as the second wire or electrical route. In other examples, the seat post 114 may include more than two wires.

Still referring to FIG. 9, the air above the bobbin 934 is in communication with the first chamber 416 (the positive chamber) and the air below the bobbin 934 is at atmospheric pressure. Therefore, this pressure differential generates a net downward force on the bobbin 934, which holds the bobbin 934 firmly in place against the shoulder 940 of the second body portion 902. In some instances, this downward force can be quite large. Therefore, in some examples, the bobbin 934 is constructed of a relatively strong material, such as anodized aluminum. Further, the bobbin 934 may be anodized to electrically insulate it from the coil 936. Although the coil 936 may have its own insulation, the anodizing on the bobbin 934 provides an additional layer of protection against electrical short circuits.

FIG. 13 is a perspective view of the plug assembly 916 showing the plug 918, the seal 920, and the seal retainer 922. In some examples, the plug 918 and the seal retainer 922 are constructed of a ferromagnetic material, such as steel. In other examples, the plug 918 and/or the seal retainer 922 can be constructed of other materials. In some examples, the seal 920 may be constructed of a compliant material, such as nitrile rubber (e.g., Buna-N).

In some examples, the seal retainer 922 has one or more vent features to help relieve pressure from below the seal 920. FIG. 14 is a bottom perspective view of the seal retainer 922. As shown in FIG. 14, the inner surface 1018 of the seal retainer 922 has four grooves or recesses 1400, which are spaced equitant from each other. FIG. 15 is an enlarged cross-sectional view of the plug 918, the seal 920, and the seal retainer 922 taken along a plane intersects two of the grooves 1400. During a closing operation when the seal 920 is moved into contact with the shoulder 930 (FIG. 9), the seal 920 may slightly compress, which creates a pressure on the bottom side of the seal 920. The grooves 1400 relieve pressure from below the seal 920 when the seal 920 is engaged with the shoulder 930. In particular, as shown in FIG. 15, the grooves 1400 provide a path for any pressure build-up below the seal 920 to escape, thereby equalizing the pressures above the seal 920 and below the seal 920. This is advantageous because excessive pressure build-up below the seal 920 could cause the seal 920 to be forcefully ejected, or extruded, out of the space in which it is intended to be retained. While in this example the seal retainer 922 has four grooves, in other examples, the seal retainer 922 can include one groove, two grooves, three grooves, five grooves, etc.

Figure 16:
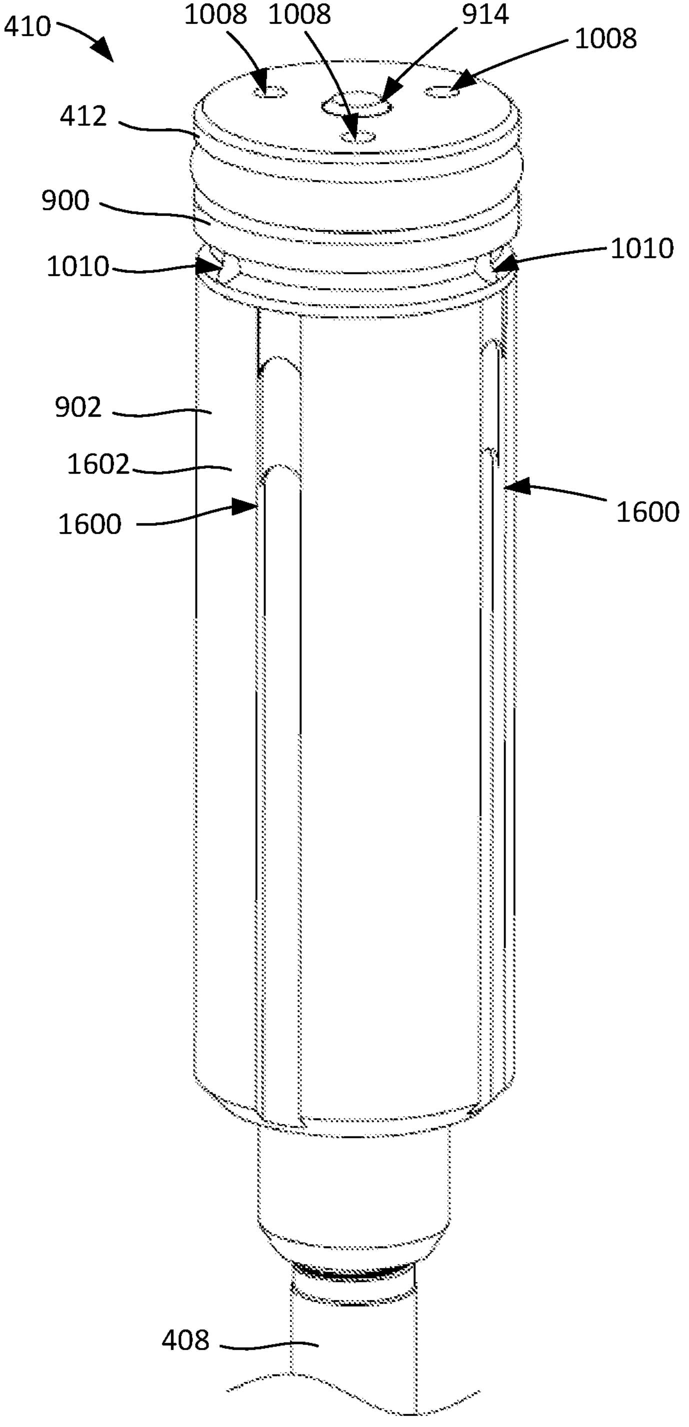
FIG. 16 is a perspective view of the example piston assembly of FIG. 9.

FIG. 16 is a perspective view of the piston assembly 410 coupled to the shaft 408. The central channel 914, the axial channels 1008, and the radial channels 1010 are labeled in FIG. 16 In this example, the first body portion 900 of the piston 412 has three axial channels 1008. The axial channels 1008 are spaced equidistant from each other and arranged circumferentially around the central channel 914. In other examples, the piston 412 can include more or fewer axial channels and/or the axial channels can be arranged in other configurations. In this example, the first body portion 900 of the piston 412 has four radial channels 1010 (two of which are visible in FIG. 16). The radial channels 1010 are spaced equidistant from each other (e.g., 90° apart). In other examples, the piston 412 may have more or fewer radial channels and/or the radial channels can be arranged in other configurations.

As shown in FIG. 16, the second body portion 902 of the piston 412 has a plurality of grooves 1600 (e.g., channels) that extend axially along an outer surface 1602 of the second body portion 902. When the seat post 114 is fully extended as shown in FIGS. 2 and 4, the volume of the second chamber 418 (the negative chamber) approaches but does not reach zero. This is because there are still small volumes of the pressurized fluid retained in the radial channels 1010, the grooves 1600, and the clearances between parts. These volumes remain filled with pressurized air. When the rider sits on the seat 112, the air in these volumes acts to bias the dropper post to compress.

In some instances, when the rider sits on the seat 112 (FIG. 1), the seat post 114 (FIG. 1) slightly compresses (i.e., the upper tube 204 telescopes into the lower tube 202), causing the pressure in the first chamber 416 to rise and the pressure in the second chamber 418 to drop until a new force balance is achieved, at which point the seat post 114 stops compressing. This slight compression can be beneficial to the rider, effectively acting as a suspension system that increases rider comfort in bumpy terrain. However, when the seat post 114 is fully extended, such as shown in FIGS. 2 and 4, the rider typically wants to maximize pedaling efficiency, and therefore may view any seat post compression as undesirable. As mentioned above, when the seat post 114 is fully extended, the volume of the second chamber 418 approaches, but does not reach, zero. This is because there are still small volumes of fluid in the radial channels 1010, the grooves 1600, and the clearances between parts. These volumes remain filled with pressurized air, which can expand to allow the seat post 114 to slightly compress when the rider sits on the seat 112.

Figures 17, 18:
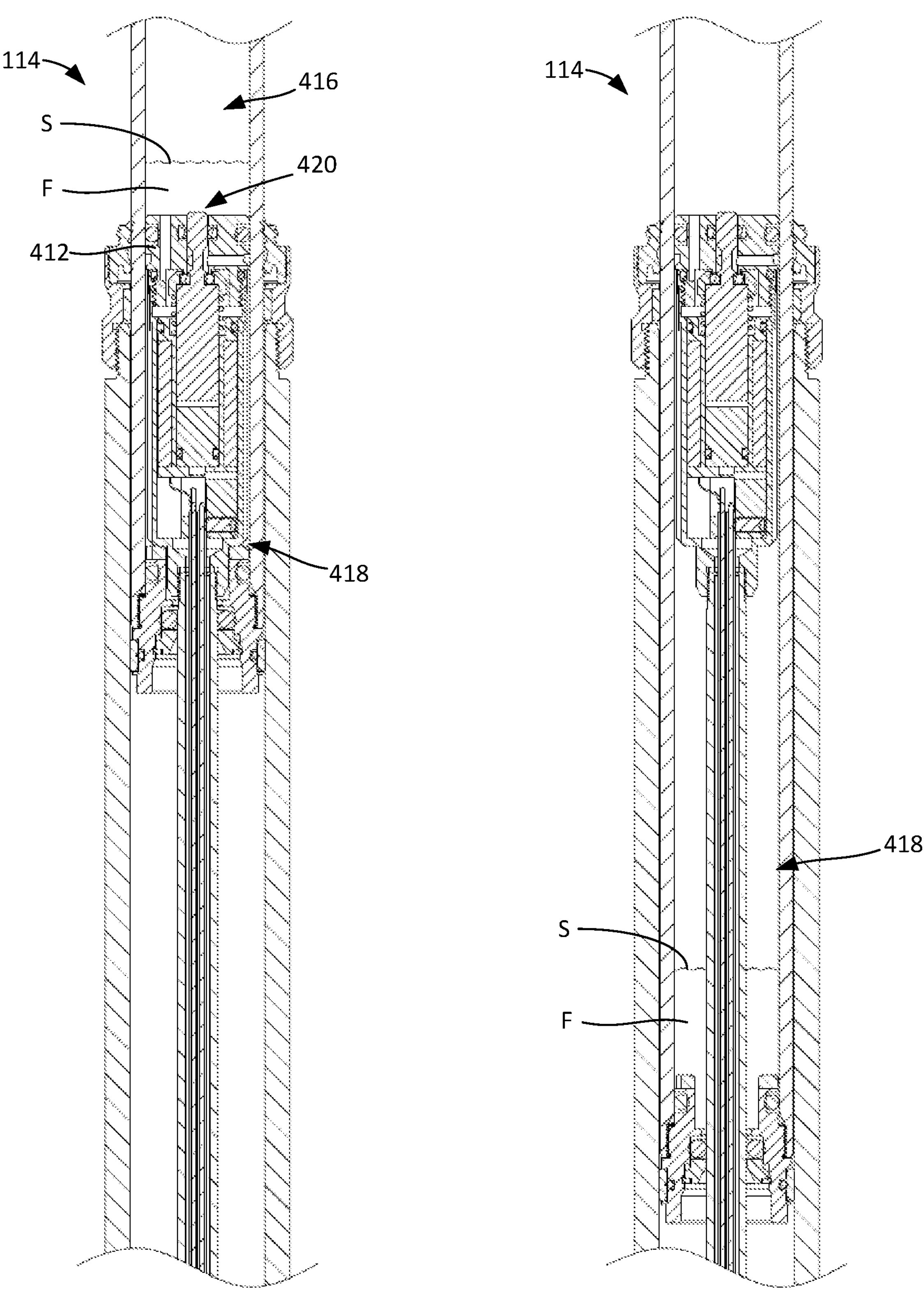
FIG. 17 is a cross-sectional view of the example seat post of FIG. 2 in the fully extended position and in which the example seat post includes a volume of incompressible fluid.
FIG. 18 shows the example seat post of FIG. 17 in the partially contracted position.

In some examples, to limit or prevent this compression in the fully extended position, the example seat post 114 can include a certain amount of incompressible fluid, such as mineral oil, which is added to the second chamber 418. For example, FIG. 17 is a cross-sectional view of the seat post 114 in the fully extended position, and FIG. 18 is a cross-sectional view of the seat post 114 in a partially contracted position. As shown in FIG. 18, the seat post 114 includes a volume of incompressible fluid (F) in the upper tube 204. In particular, the volume of incompressible fluid (F) is in the second chamber 418 (the negative chamber) of the upper tube 204. In some examples, the incompressible fluid (F) is mineral oil. Air occupies the space above the surface (S) of the fluid (F). When the seat post 114 is then fully extended, as shown in FIG. 17, the volume of the second chamber 418 approaches, but does not reach, zero, as previously described. The volume of the second chamber 418 in this state is called the residual volume. The volume of incompressible fluid (F) is greater than the residual volume, and therefore the excess fluid (F) is forced through the valve 420 and moves into the first chamber 416. The upper surface (S) of the fluid (F) is now in the first chamber 416 above the piston 412. In this state, the air in the second chamber 418 has been replaced by the fluid (F). In other words, the incompressible fluid (F) fills the second chamber 418. As such, there is virtually no air in the second chamber 418 to enable the seat post 114 to compress. The only air pressure acting on the seat post is the air pressure in the first chamber 416, acting to bias the seat post 114 to extend. Thus, the seat post 114 does not compress while it is in the fully extended position, even if the rider is sitting on the seat 112 (FIG. 1). In some examples, the seat post 114 may still compress under extreme forces, but such forces are well above the forces that arise while riding the bicycle 100 (FIG. 1). In the illustrated example, the volume of the fluid (F) is greater than the volume of the residual volume. However, in other examples, the volume of the fluid (F) may be equal to or less than the residual volume. In such an example, the seat post 114 may still compress a small amount when the rider sits on the seat 112, but the amount of compression is still less than if there were no fluid (F) in the system.

Figure 19:
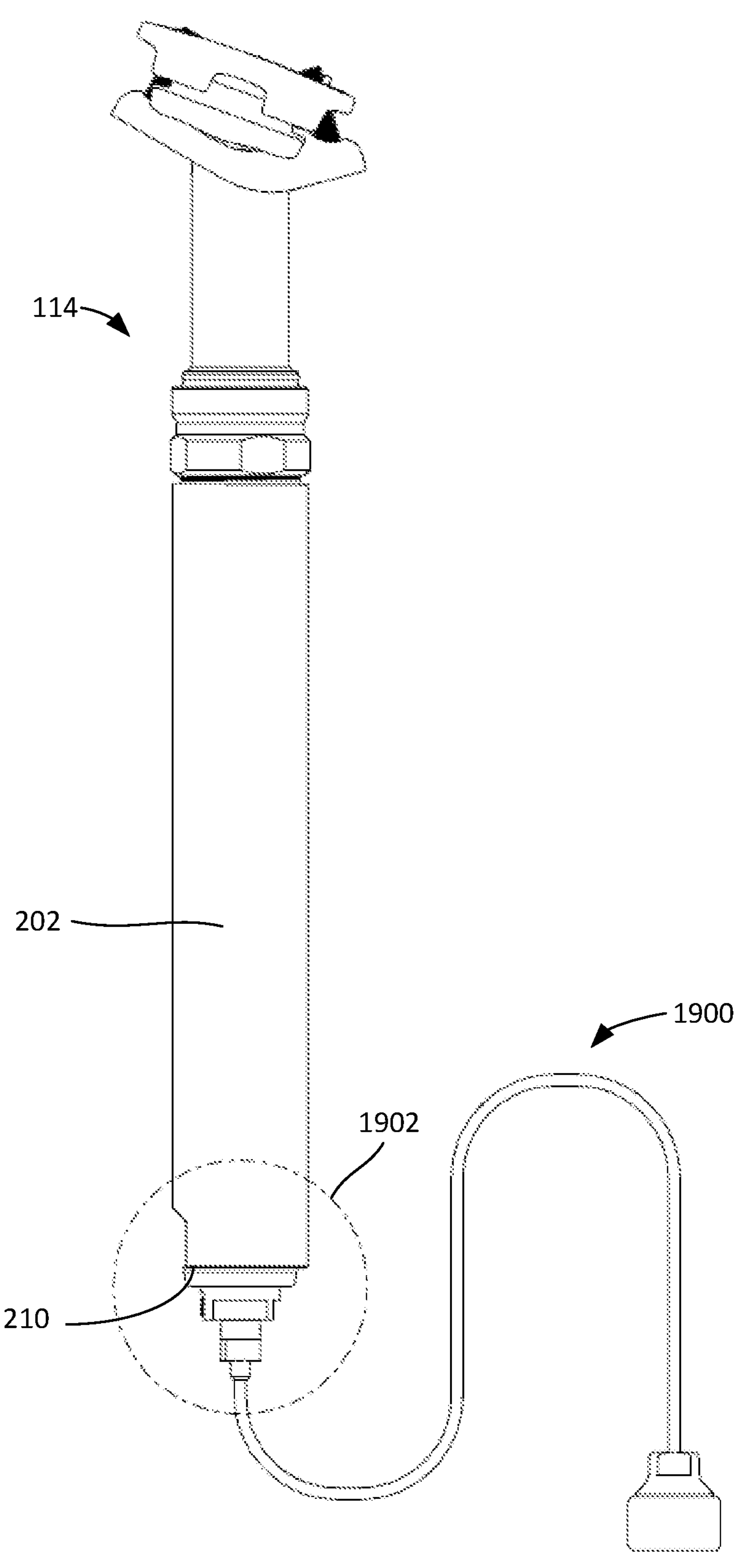
FIG. 19 is a side view of the example height adjustable seat post of FIG. 2 including an example seat post connector assembly used to electrically connect the example height adjustable seat post to the bicycle.

Also disclosed herein are example connector systems including connector assemblies for electrically connecting the seat post 114 to the drive unit 146 (FIG. 1) and/or other electrical components on the bicycle 100. FIG. 19 illustrates the example seat post 114 including an example first connector assembly 1900, referred to herein as the seat post connector assembly. In this example, the seat post connector assembly 1900 is coupled to a bottom of the seat post 114. For example, the seat post connector assembly 1900 is coupled to the lower end 210 of the lower tube 202. When the seat post 114 is installed on the bicycle 100, the seat post connector assembly 1900 can be connected to a mating connector assembly on the bicycle 100 and thereby enable power and/or signals to be transferred between the seat post 114 and the bicycle 100. Therefore, the seat post connector assembly 1900 forms an electrical interface between the seat post 114 and the bicycle 100.

Figures 20, 21:
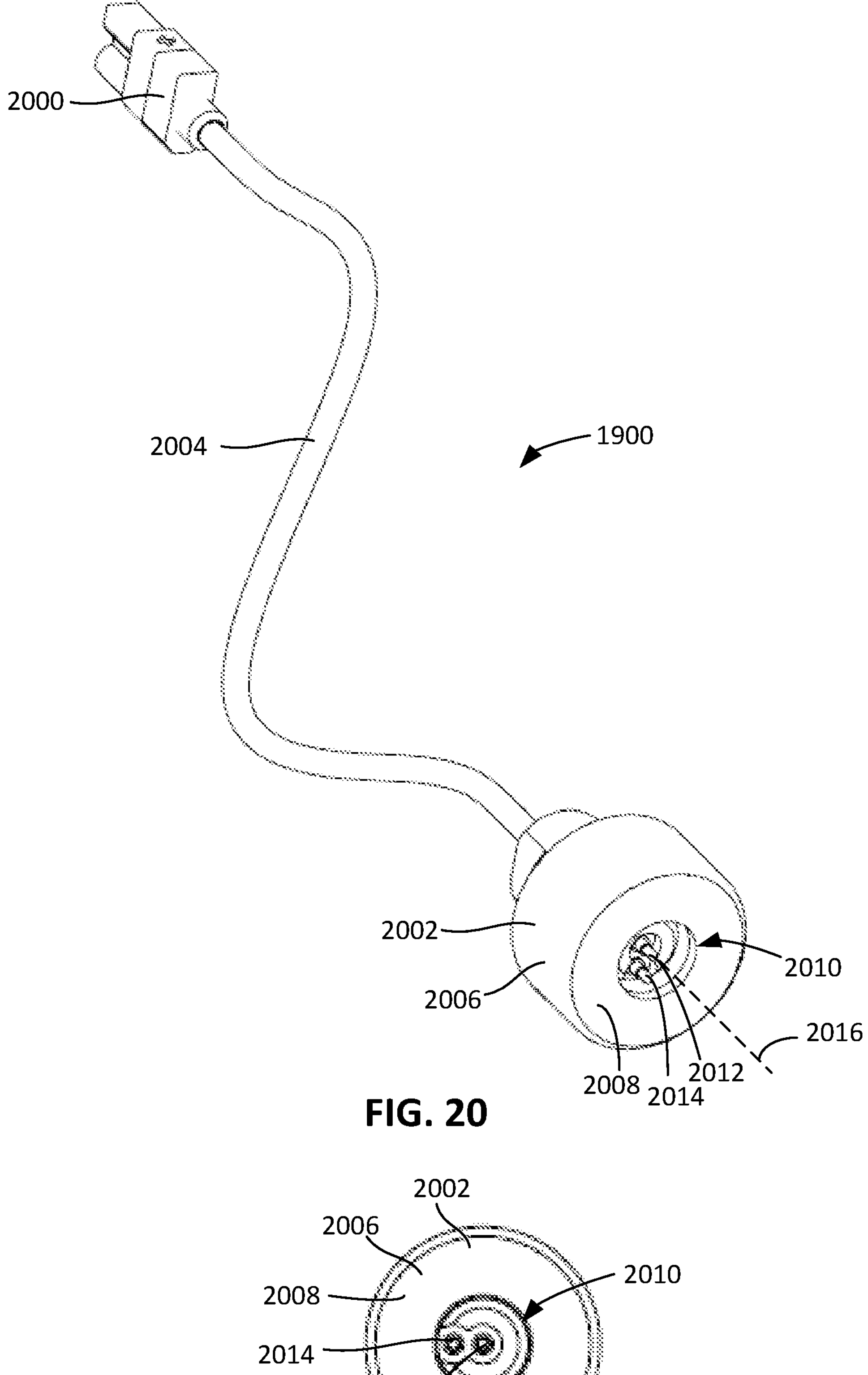
FIG. 20 is a perspective view of the example seat post connector assembly of FIG. 19.
FIG. 21 is an end view of an example first magnetic connector on the seat post connector assembly of FIG. 20.

FIG. 20 is a perspective view of the example seat post connector assembly 1900. In the illustrated example, the seat post connector assembly 1900 includes a first connector 2000, a second connector 2002, and a cable 2004 (which may include one or more wires) between the first and second connectors 2000, 2002. The first connector 2000 is configured to mate with the connector 808 (FIG. 8) on the seat post 114 (FIG. 8), while the second connector 2002 is configured to mate with a corresponding connector of a bicycle connector assembly, as disclosed in further detail herein. The cable 2004 electrically connects the first and second connectors 2000, 2002. The cable 2004 may be any length. In this example, the first connector 2000 is a two-pin connector, referred to herein as the two-pin connector 2000, and the second connector 2002 is a magnetic connector, referred to herein as a first magnetic connector 2002. The first magnetic connector 2002 includes one or more magnets, as disclosed in further detail herein, that help the first magnetic connector 2002 to align and mate with a second magnetic connector on the bicycle 100 (FIG. 1).

FIG. 21 is an end view of the first magnetic connector 2002. As shown in FIGS. 20 and 21, the first magnetic connector 2002 has a housing 2006. The housing 2006 comprises a first housing portion 2208 and a second housing portion 2007 with an end surface 2008 with an opening 2010. In some examples, the housing 2006 is constructed of plastic or another non-conductive material. The first magnetic connector 2002 includes first and second electrical contacts, in this example, first and second pins 2012, 2014. The first and second pins 2012, 2014 are at least partially disposed in the opening 2010. In some examples, the first and second pins 2012, 2014 are spring-loaded pins, sometimes referred to as pogo pins. As shown, the first pin 2012 is co-axial with a central axis 2016 of the first magnetic connector 2002, and the second pin 2014 is radially offset from the central axis 2016. As disclosed in further detail, this enables the first magnetic connector 2002 to mate with a corresponding magnetic connector at any angular orientation.

Figure 22:
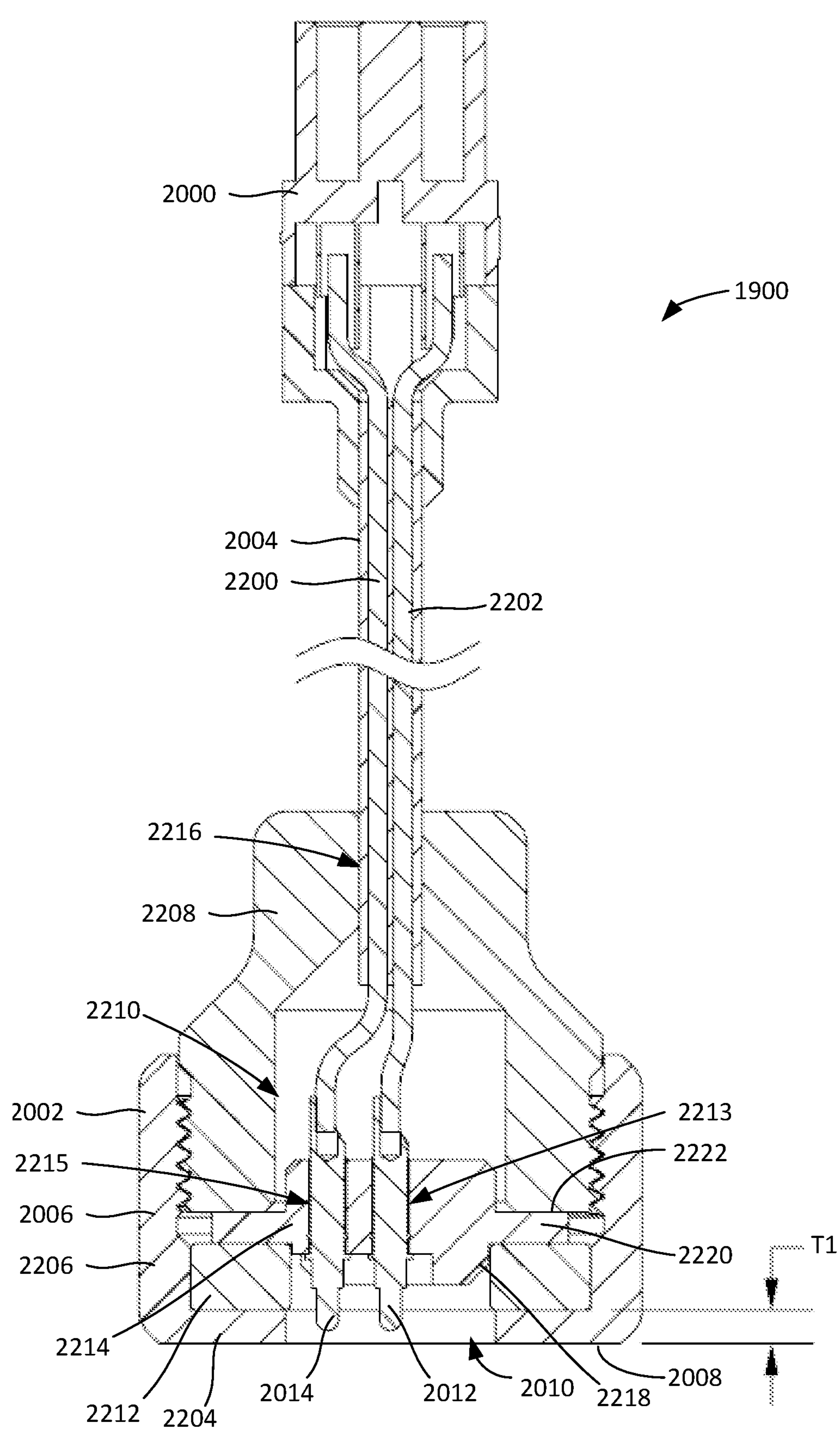
FIG. 22 is a cross-sectional view of the example seat post connector assembly of FIG. 20.
Figure 23:
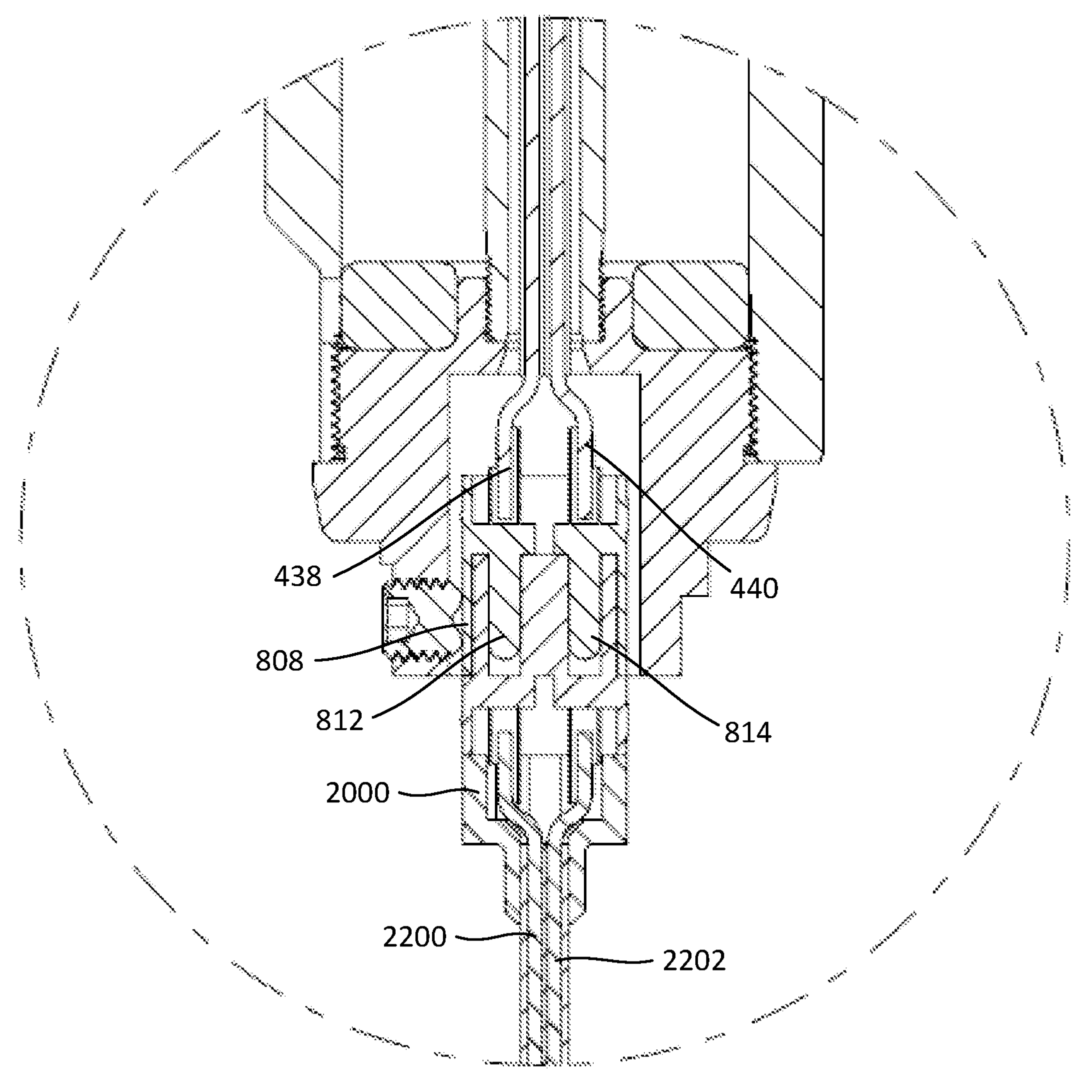
FIG. 23 is a cross-sectional view of the callout in FIG. 19 showing an example connector of the seat post connector assembly of FIG. 20 connected to a corresponding connector on the bottom of the example height adjustable seat post.

FIG. 22 is a cross-sectional view of the example seat post connector assembly 1900. The seat post connector assembly 1900 includes first and second wires 2200, 2202 that form the cable 2004. The first and second wires 2200, 2202 can be sheathed and/or insulated. The first and second wires 2200, 2202 extend between the two-pin connector 2000 and the first magnetic connector 2002. The two-pin connector 2000 can be connected to the connector 808 on the bottom of the seat post 114. For example, FIG. 23 is an enlarged cross-sectional view of the callout 1902 of FIG. 19. FIG. 23 shows the two-pin connector 2000 connected to the connector 808. When the two-pin connector 2000 is connected (e.g., plugged) into the connector 808, the first pin 812 makes an electrical connection between the first wires 438, 2200, and the second pin 814 makes an electrical connection between the second wires 440, 2202. As such, the first wires 438, 2200 are electrically connected, and the second wires 440, 2202 are electrically connected.

Referring to FIG. 22, the second housing portion 2007 has an end wall 2204 and an annular side wall 2206 extending from an outer peripheral edge of the end wall 2204. The opening 2010 is formed through the end wall 2204. The first housing portion 2208 is coupled to the second housing portion 2007. In this example, the second housing portion 2007 is threadably coupled to the annular side wall 2206. The first housing portion 2208 and the second housing portion 2007 form a cavity 2210.

In the illustrated example, the first magnetic connector 2002 includes a first magnet 2212. The first magnet 2212 is in the housing 2006. In particular, the first magnet 2212 is disposed in the cavity 2210 formed by the first and second housing portions 2208, 2008. In this example, the first magnet 2212 is disk- or ring-shaped. The first and second pins 2012, 2014 extended through an inner diameter of the first magnet 2212. In some examples, the magnet 2212 is a neodymium magnet. The first magnet 2212 is magnetized along its thickness. Therefore, one of magnetic poles is on the bottom face of the first magnet 2212, and the other pole is on the top face of the first magnet 2212.

In the illustrated example, the first magnet 2212 is disposed along an inner surface of the end wall 2204. The end wall 2204 has a thickness of T1. As such, the magnet 2212 is spaced from the outer or end surface 2008 of the first magnetic connector 2002 by a distance of T1. However, in other examples, one or more parts or layers can be disposed between the first magnet 2212 and the end wall 2204, such that the distance between the first magnet 2212 and the end surface 2008 is greater than T1.

The first and second pins 2012, 2014 extend through the first magnet 2212. In the illustrated example of FIG. 22, the first magnetic connector 2002 includes a retainer 2214 in the cavity 2210. The retainer 2214 holds or mounts the first and second pins 2012, 2014. In this example, the first and second pins 2012, 2014 are disposed in (e.g., pressed into) respective 2213, 2215 channels in the retainer 2214. The first and second wires 2200, 2202 extend through a channel 2216 in the first housing portion 2208 and into the cavity 2210 and are electrically connected (e.g., crimped, soldered) to respective ones of the first and second pins 2012, 2014. The retainer 2214 is radially located by a boss 2218 that fits in the inner diameter of the first magnet 2212. The first and second pins 2012, 2014 are spaced from (e.g., not in contact with) the first magnet 2212. In some examples, the retainer 2214 is constructed of plastic, such as nylon or acetal. Therefore, the first and second pins 2012, 2014 are electrically isolated or separated from the first magnet 2212 by the retainer 2214. In the illustrated example, the retainer 2214 has a flange 2220. As shown in FIG. 22, when the first housing portion 2208 is screwed into the second housing portion 2007, the flange 2220 and the magnet 2212 are clamped between an edge 2222 of the first housing portion 2208 and the end wall 2204 of the second housing portion 2007. As such, the retainer 2214 and the first magnet 2212 are securely held in the cavity 2210 of the first magnetic connector 2002.

Figure 24:
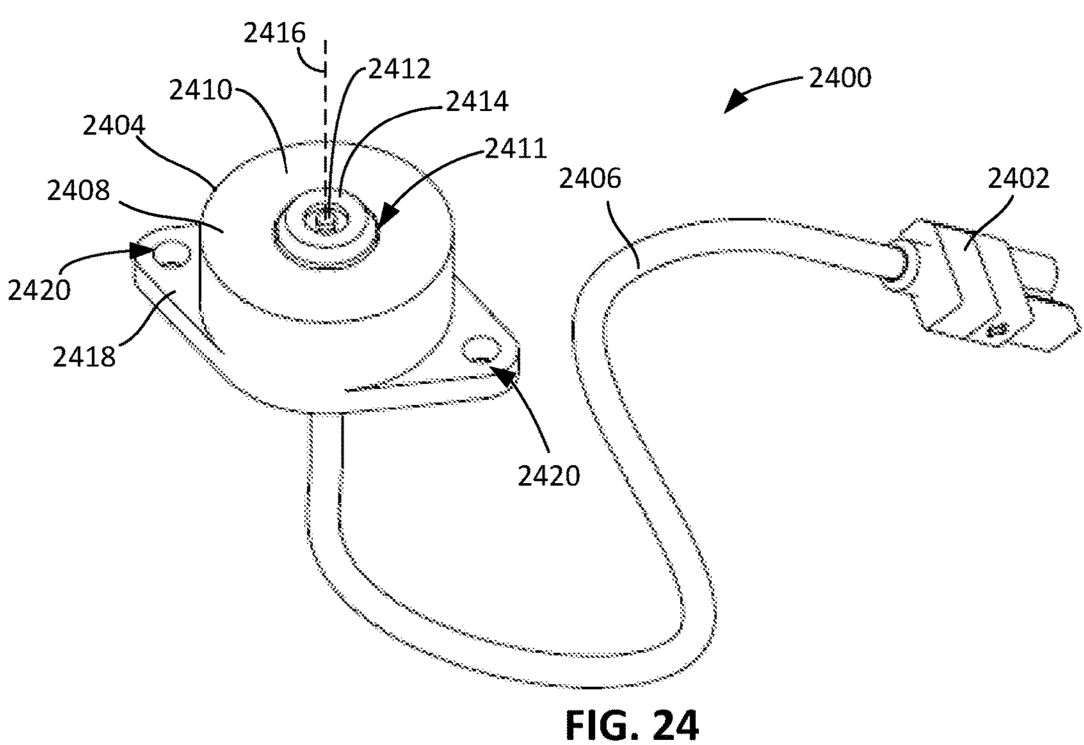
FIG. 24 is a perspective view of an example bicycle connector assembly that can be connected to the bicycle of FIG. 1.

FIG. 24 is a perspective view of an example second connector assembly 2400, referred to herein as the bicycle connector assembly 2400. The bicycle connector assembly 2400 can be coupled to the drive unit 146 to form an interface or connection between the seat post connector assembly 1900 (FIG. 19) of the seat post 114 (FIG. 19) and the drive unit 146 (FIG. 1) on the bicycle 100. In the illustrated example, the bicycle connector assembly 2400 includes a first connector 2402, a second connector 2404, and a cable 2406 (which may include one or more wires) between the first and second connectors 2402, 2404. The first connector 2402 is configured to mate with a corresponding connector on the drive unit 146, while the second connector 2404 is configured to mate with the first magnetic connector 2002 of the seat post connector assembly 1900. The cable 2406 electrically connects the first and second connectors 2402, 2404. The cable 2406 may be any length. In this example, the first connector 2402 is a two-pin connector, but in other example can be implemented by another type of electrical connector. The second connector 2404 is a magnetic connector, referred to herein as a second magnetic connector 2404. The second magnetic connector 2404 mates with the first magnetic connector 2002, disclosed in further detail herein.

In the illustrated example of FIG. 24, the second magnetic connector 2404 has a housing 2408 with an end surface 2410. The housing 2408 has an opening 2411 extending into the end surface 2410. In some examples, the housing 2408 is constructed of plastic or another non-conductive material. The second magnetic connector 2404 includes a third electrical contact 2412 and a fourth electrical contact 2414. The third and fourth electrical contacts 2412, 2414 are at least partially disposed in the opening 2411 and extend outward from the opening 2411. In this example, the fourth electrical contact 2414 is ring-shaped, and the third electrical contact 2414 is pin-shaped and disposed within (e.g., co-axial with) the fourth electrical contact 2414. The third and fourth electrical contacts 2412, 2414 may also be referred to as inner and outer electrical contacts. The third and fourth electrical contacts 2412, 2414 are co-axial with a central axis 2416 of the magnetic connector 2002. In the illustrated example, the housing 2408 has a flange 2418 with openings 2420 that can receive threaded fasteners (e.g., bolts) to couple the second magnetic connector 2404 to the bicycle 100 (FIG. 1).

Figure 25:
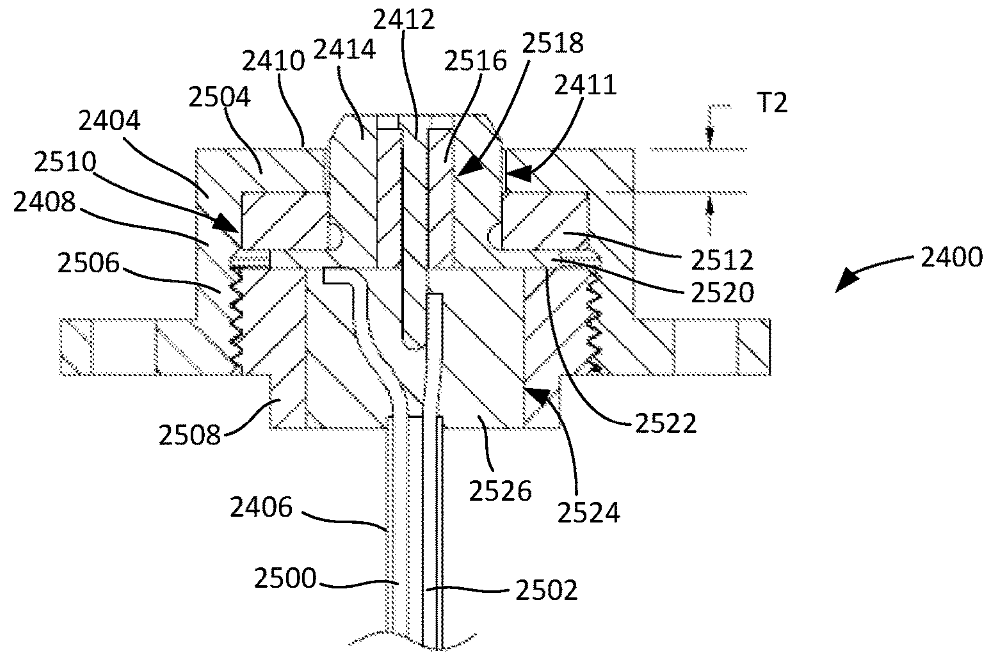
FIG. 25 is a cross-sectional view of an example second magnetic connector of the example bicycle connector assembly of FIG. 24.

FIG. 25 is a cross-sectional view of the second magnetic connector 2404 and a portion of the cable 2406 of the bicycle connector assembly 2400. The bicycle connector assembly 2400 includes first and second wires 2500, 2502 that form the cable 2406. The first and second wires 2500, 2502 can be sheathed and/or insulated. The first and second wires 2200, 2202 extend between the first connector 2402 (FIG. 24) and the second magnetic connector 2404.

In the illustrated example of FIG. 25, the housing 2408 of the second magnetic connector 2404 has an end wall 2504 and an annular side wall 2506 extending from an outer peripheral edge of the end wall 2504. The opening 2411 is formed through the end wall 2504. The second magnetic connector 2404 includes a cap 2508 that is coupled to the housing 2408. In this example, the cap 2508 is threadably coupled to the annular side wall 2506. The housing 2408 and the cap 2508 form a cavity 2510.

In the illustrated example, the second magnetic connector 2404 includes a second magnet 2512 in the housing 2408. In particular, the second magnet 2512 is disposed in the cavity 2510 formed by the housing 2408 and the cap 2508. The magnet 2512 is disk- or ring-shaped. In some examples, the magnet 2512 is a neodymium magnet. Similar to the first magnet 2212 (FIG. 22), the second magnet 2512 is magnetized along its thickness, such that one of magnetic poles is on the bottom face of the second magnet 2512, and the other pole is on the top face of the second magnet 2512. In the illustrated example, the second magnet 2512 is disposed along an inner surface of the end wall 2504. The end wall 2504 has a thickness of T2. As such, the second magnet 2512 is spaced from the end surface 2410 of the second magnetic connector 2404 by a distance of T2. However, in other examples, one or more parts or layers can be disposed between the second magnet 2512 and the end wall 2504, such that the distance between the second magnet 2512 and the end surface 2410 is greater than T2.

As shown in FIG. 25, the fourth electrical contact 2414 is disposed in the cavity 2510. A portion of the fourth electrical contact 2414 is radially located by an inner diameter of the second magnet 2512. The fourth electrical contact 2414 extends through the opening 2411 and beyond the end surface 2410. In the illustrated example, the second magnetic connector 2404 includes a cylindrical insulator 2516 disposed (e.g., press fit) in a central channel 2518 in fourth electrical contact 2414. The cylindrical insulator 2516 is constructed of electrically insulated material. The third electrical contact 2412, which is in the shape of a pin, is disposed (e.g., press fit) in the cylindrical insulator 2516. As such, the third electrical contact 2412, the fourth electrical contact 2414, and the cylindrical insulator 2516 are all coupled together as a unit. The third and fourth electrical contacts 2412, 2414 are constructed of electrically conductive material (e.g., copper). The cylindrical insulator 2516 is constructed of a non-conductive material. For instance, in some examples, the cylindrical insulator 2516 is constructed of plastic, such as nylon or acetal. As such, the cylindrical insulator 2516 electrically separates or isolates the third and fourth electrical contacts 2412, 2414.

In the illustrated example, the fourth electrical contact 2414 has a flange 2520. When the cap 2508 is screwed into the housing 2408, the flange 2520 and the magnet 2512 are clamped between an edge 2522 of the cap 2508 and the end wall 2504 of the housing 2408. The wires 2500, 2502 extend through channel 2524 in the cap 2508. One of the wires 2500, 2502 is electrically connected (e.g., crimped, soldered) to the third electrical contact 2412, and the other wire 2500, 2502 is electrically connected to the fourth electrical contact 2414. In the illustrated example, the channel 2524 (and space between the wires 2500, 2502) is filled with potting compound 2526. The potting compound 2526 holds the wires 2500, 2502 in place and provides strain relief to the wires 2500, 2502.

Figures 26A, 26B, 26C:
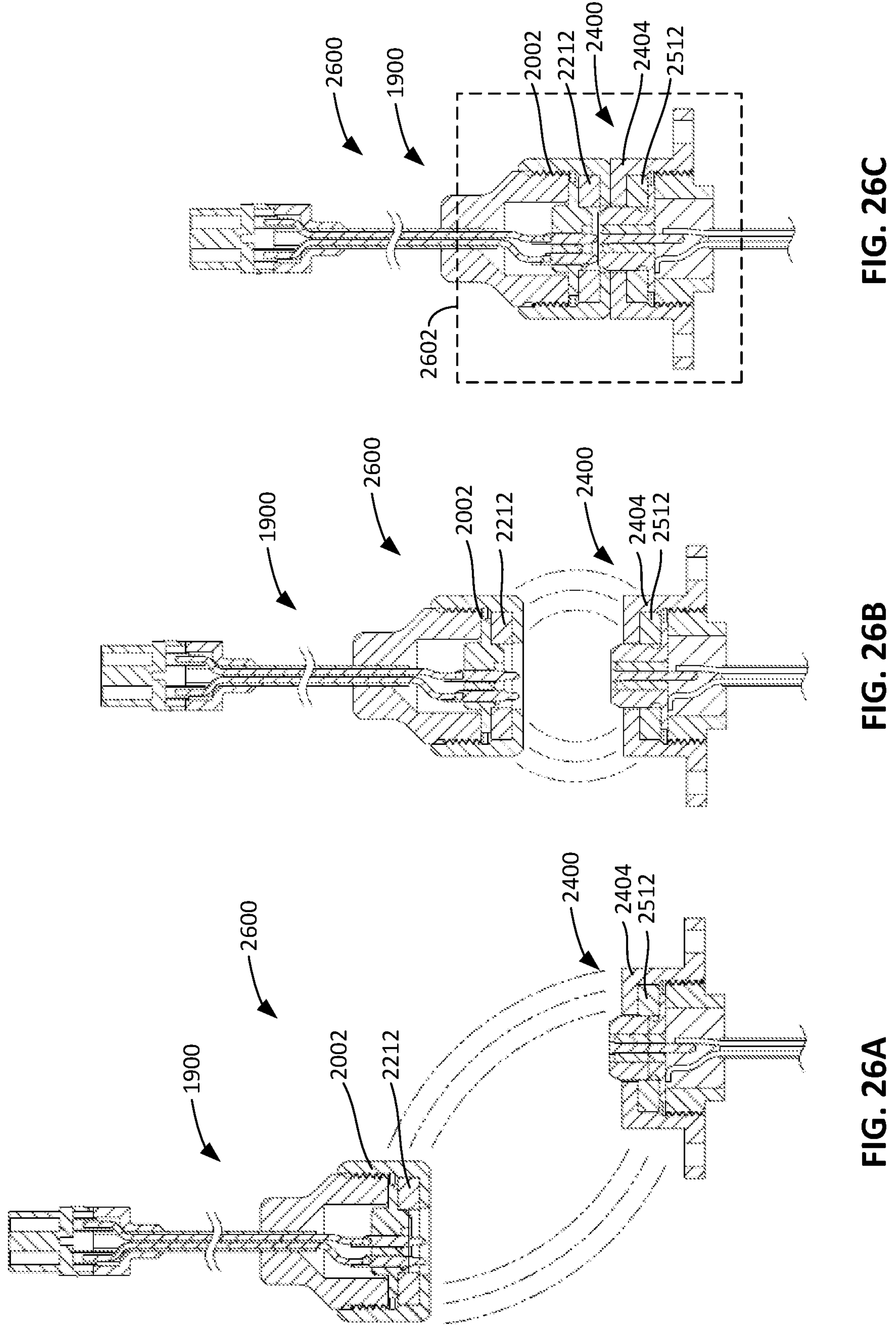
FIGS. 26A-26C show an example sequence of connecting the example first magnetic connector of the example seat post connector assembly of FIG. 19 and the example second magnetic connector of the example bicycle connector assembly of FIG. 24.

FIGS. 26A-26C show an example sequence or process of connecting the seat post connector assembly 1900 and the bicycle connector assembly 2400. The seat post connector assembly 1900 and the bicycle connector assembly 2400 may be referred to as a connector system 2600. The connector system 2600 can be used to electrically connect the seat post 114 to the bicycle 100. As shown in FIG. 26A, when the seat post connector assembly 1900 is initially brought into proximity to the bicycle connector assembly 2400, they may not be well-aligned with each other. However, the magnetic poles of the first and second magnets 2212, 2512 of the first and second magnetic connector 2002, 2404 are oriented such that they attract one another. Magnetic field lines are represented by dashed lines in the figure. The forces produced by the magnetic field tend to move the magnets 2212, 2512 and, therefore, the first and second magnetic connectors 2002, 2404, into alignment with each other as shown in FIG. 26B. In this position, the first and second magnetic connectors 2002, 2404 are axially aligned. Then, as shown in FIG. 26C, as the first and second magnetic connectors 2002, 2404 contact one another they are already well-aligned. Once the first and second magnetic connectors 2002, 2404 are contacting, the magnetic field holds the first and second magnetic connectors 2002, 2404 together.

Figure 27:
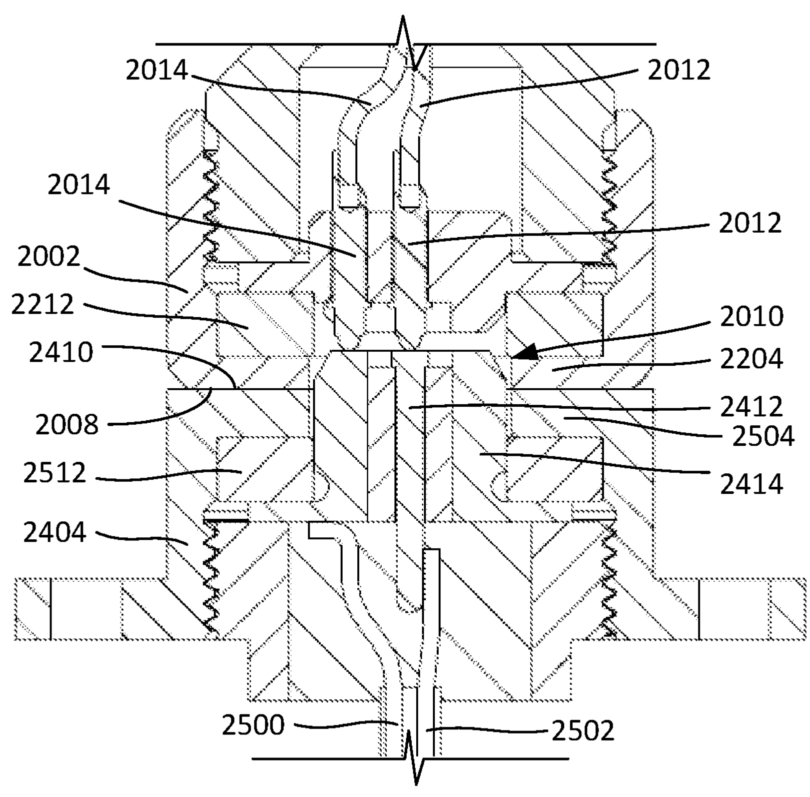
FIG. 27 is an enlarged view of FIG. 26C showing the example first magnetic connector and the example second magnetic connector in a connected state.

FIG. 27 is an enlarged view of the callout 2602 of FIG. 26C showing the mating of the first and second magnetic connectors 2002, 2404. As shown in FIG. 27, the end surface 2008 of the first magnetic connector 2002 is engaged with the end surface 2410 of the second magnetic connector 2404. The magnetic force between the two magnets 2212, 2512 holds the magnetic connectors together until a sufficient force is applied to separate the first and second magnetic connectors 2002, 2402. A portion of the fourth electrical contact 2414 extends into the opening 2010 in the end wall 2204 of the first magnetic connector 2002, which axially aligns the first and second magnetic connectors 2002, 2402. As shown in FIG. 27, the first pin 2012 of the first magnetic connector 2002 contacts the third electrical contact 2412 of the second magnetic connector 2404, and the second pin 2014 of the first magnetic connector 2002 contacts the fourth electrical contact 2414 of the second magnetic connector 2044. As such, the pins 2012, 2014 and the electrical contacts 2412, 2414 are in electrical contact and form electrical paths between the respective wires 2500, 2502, 2200, 2202. As such, electricity can flow from the first connector 2402 (FIG. 24), though the wires 2500, 2502, through the electrical contacts 2412, 2414, through the pins 2012, 2014, and through the wires 2200, 2202 (FIG. 22) to the two-pin connector 2000 (FIG. 20). Therefore, the magnetic attraction between the first and second magnets 2212, 2512 holds the first and second magnetic connectors 2002, 2404 such that the end surface 2008 is in contact with the end surface 2410 and the first and second pins 2012, 2014 are in contact with the respective third and fourth electrical contacts 2412, 2414.

In some examples, the pins 2012, 2014 are spring-loaded pins. Therefore, the pins 2012, 2014 may compress slightly when contacting the third and fourth electrical contacts 2412, 2414. Because the fourth electrical contact 2414 is ring-shaped, the second pin 2014 makes contact with the fourth electrical contact 2414 at any angular orientation. Therefore, unlike known two-pin connectors that must be perfectly aligned in one orientation, the example first and second magnetic connectors 2002, 2404 can be connected at any angular orientation. While in this example the two pins 2012, 2014 are on the first magnetic connector 2002 and the electrical contacts 2412, 2414 are on the second magnetic connector 2404, in other examples the pins and electrical contacts can be switched. In the illustrated example, the first and second magnets 2212, 2512 are ring-shaped magnets. However, in other examples, the first and second magnets 2212, 2512 can be other shaped magnets (e.g., rectangular). Further, the first and second magnetic connectors 2002, 2404 can include multiple magnets (e.g., two, three, four, etc.).

As can be appreciated, the magnets 2212, 2512 are not used as electrical contacts and do not contact each other, which is commonly seen in known magnetic connectors. This is advantageous because if the magnets 2212, 2512 were used as electrical contacts and therefore were required to contact each other, then any foreign grit or debris, ferrous or non-ferrous, could easily get between the magnets 2212, 2512 and prevent proper contact therebetween. By contrast, the example shown in FIG. 27 uses the pins 2012, 2014 to make electrical contact. The pins 2012, 2014 form points of contact (as opposed to the surface contact of the face of a magnet) and are less likely to be fouled by foreign debris. Furthermore, since the pins 2012, 2014 are not themselves magnetic, the pins 2012, 2014 are unlikely to attract ferrous debris in the first place.

In general, if the magnets 2212, 2512 are not powerful enough, they may not produce a strong enough magnetic field to align the magnetic connectors 2002, 2404. On the other hand, if the magnets 2212, 2512 are too powerful and are allowed to contact each other, the magnetic force holding them together may be so great that the wires of the connectors may be overstressed when the rider removes the seat post 114 from the bicycle frame 102. Therefore, the example configuration shown in FIG. 27 is advantageous because the magnets 2212, 2512 do not physically contact each other. Instead, the magnets 2512, 2512 are spaced by the end walls 2204, 2504 of the first and second magnetic connectors 2002, 2404. As such, the magnets 2212, 2512 can be made powerful enough to align substantially misaligned connectors, and yet the magnetic force holding the connectors 2002, 2404 together is low enough so that the seat post 114 can be easily removed from the bicycle frame 102 without overstressing the wires of the first and second magnetic connectors 2002, 2404.

Figure 28:
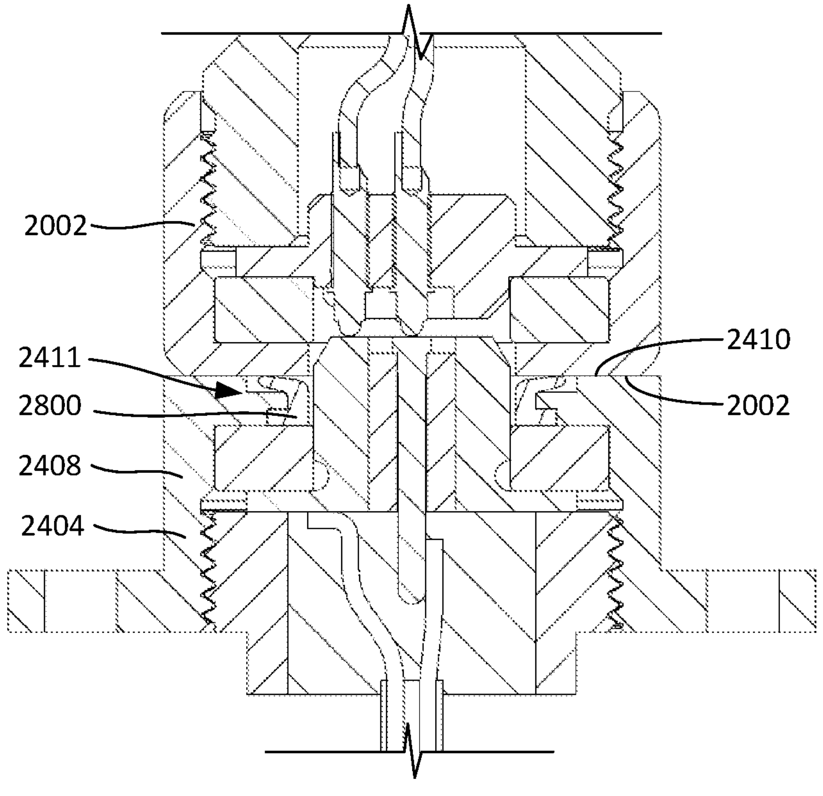
FIG. 28 is the same view as FIG. 27 and shows an example seal that can be implemented in the example second magnetic connector.

FIG. 28 shows an example seal 2800 that can be implemented in the second magnetic connector 2402. The seal 2800 is coupled to the housing 2408 and disposed in the opening 2411. The seal 2800 may be constructed of an elastomeric material, such as rubber. The seal 2800 may project outward from the end surface 2410. When the first and second magnetic connectors 2002, 2404 are connected, the seal 2800 engages the end surface 2410. The seal 2800 forms a sealing interface between the end surfaces 2008, 2410 that prevents or limits water or other debris from fouling the electrical connection.

Figure 29:
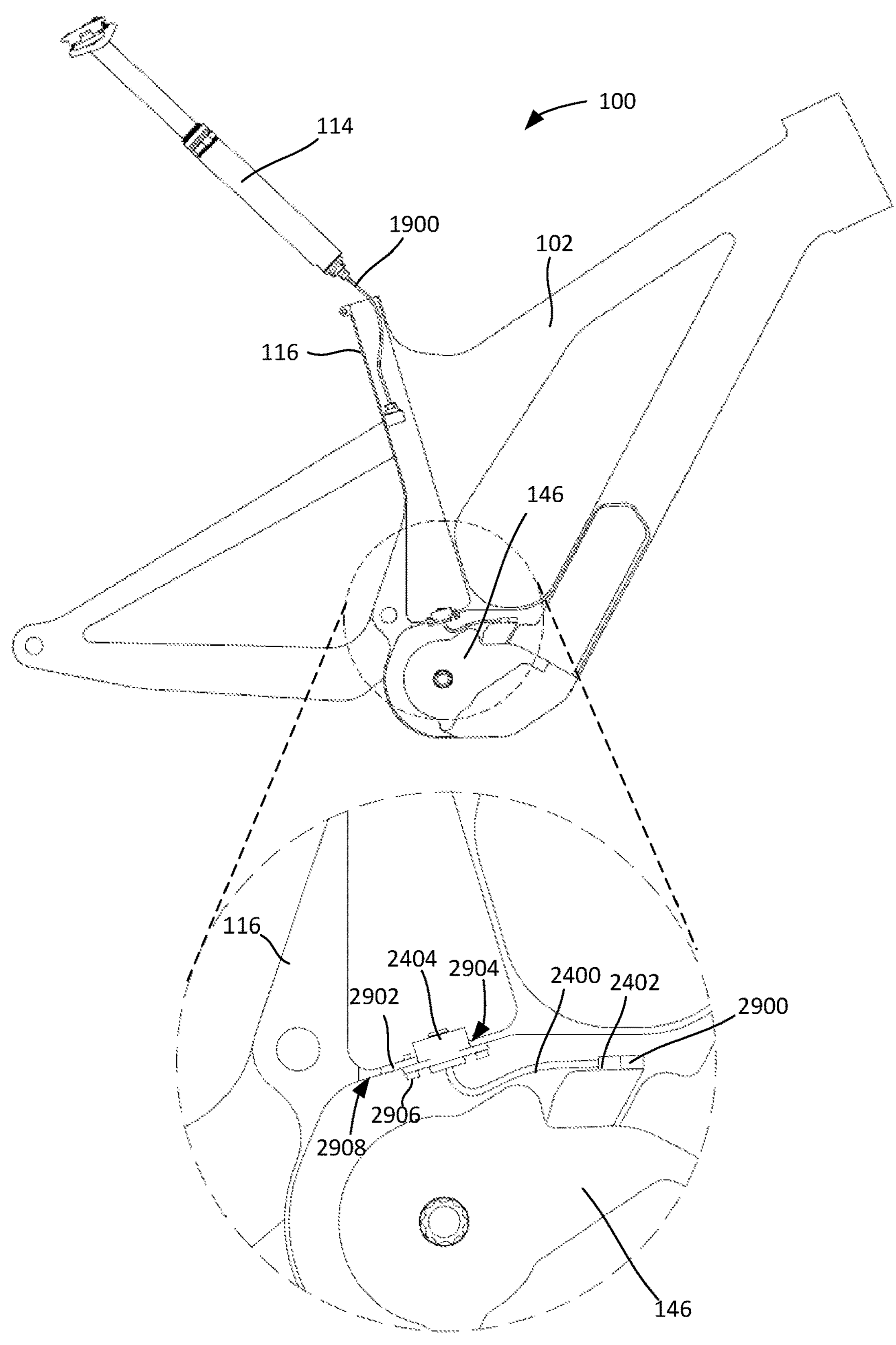
FIGS. 29, 30, and 31 show an example process of inserting the example height adjustable seat post and example seat post connector assembly of FIG. 19 into a seat tube of the bicycle of FIG. 1.
Figure 30:
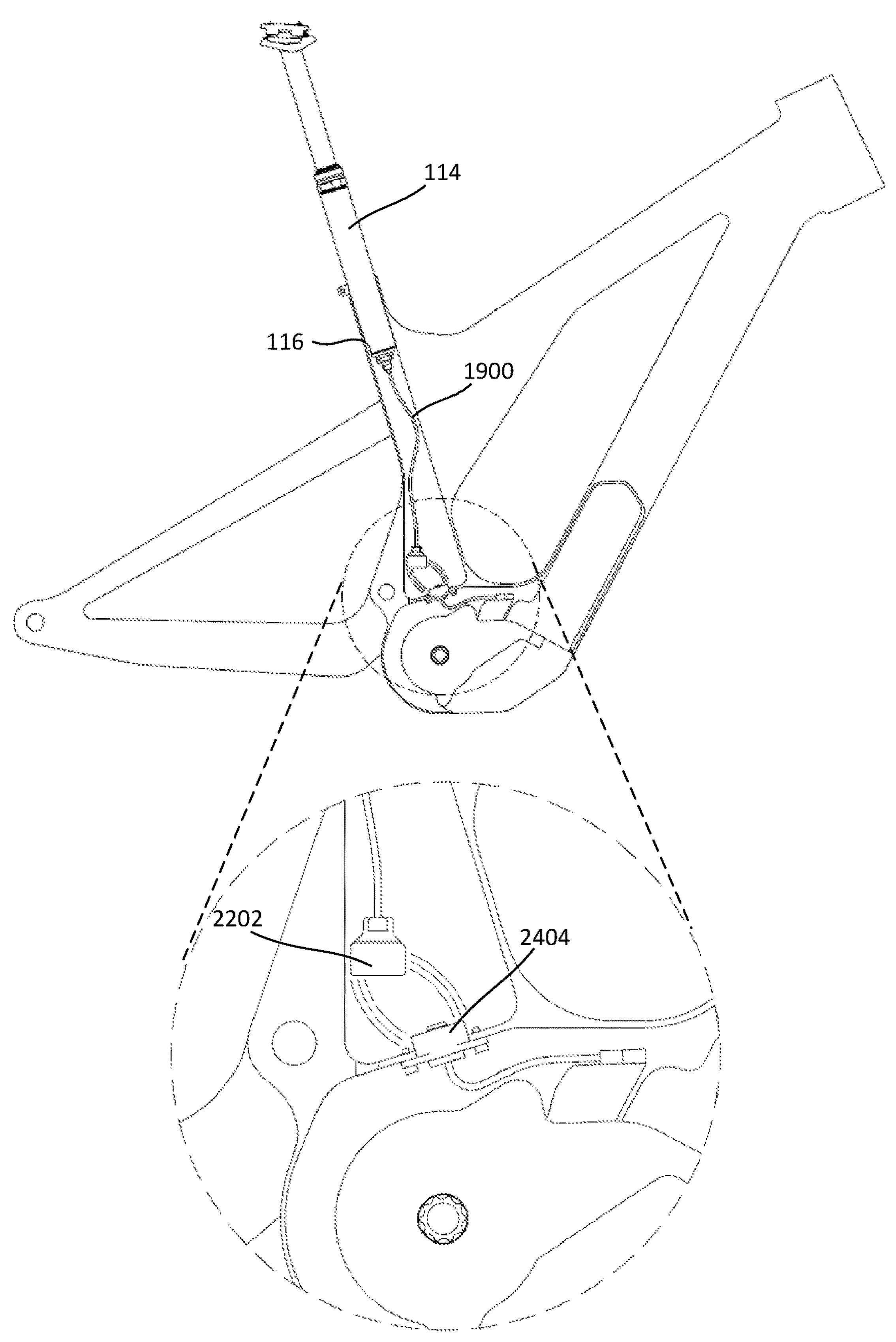
Figure 31:
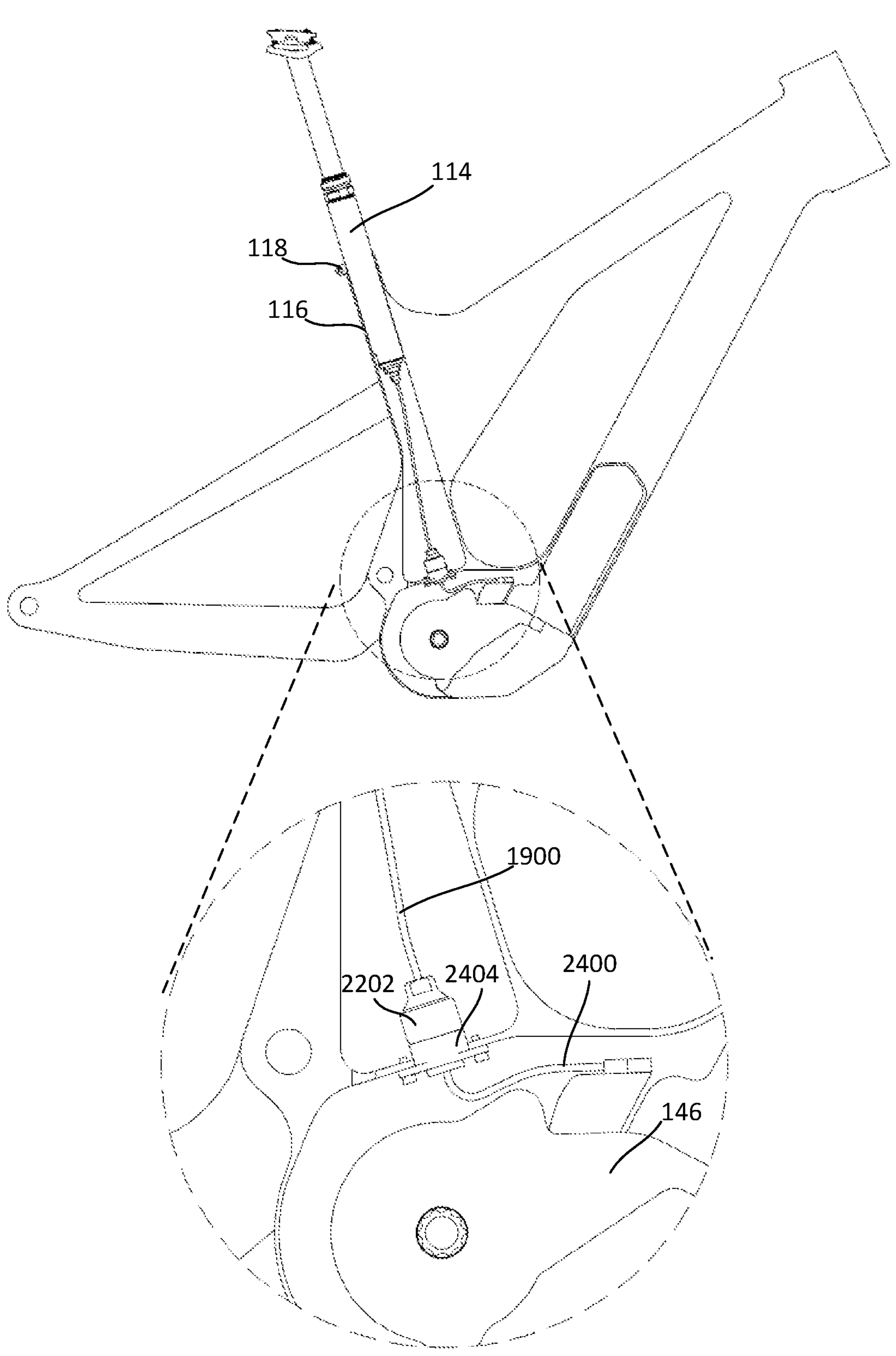

FIGS. 29-31 show an example sequence or process in which the seat post 114 with the seat post connector assembly 1900 is installed on the bicycle 100 and electrically connected to the drive unit 146. As shown in FIG. 29, the seat post connector assembly 1900 is inserted into the seat tube 116 of the frame 102 first, followed by the seat post 114. The seat tube 116 is hollow. As shown in the callout in FIG. 29, the bicycle connector assembly 2400 is installed in the frame 102. In some examples, the bicycle connector assembly 2400 is installed on the bicycle 100 during manufacture of the bicycle 100. In other examples, the bicycle connector assembly 2400 may be an after-market part that can be installed by a user. The first connector 2402 is connected to (e.g., plugged into) a mating connector 2900 (e.g., a two-pin connector) of the drive unit 146. The second magnetic connector 2404 is coupled to a bottom wall 2902 of the seat tube 116. In particular, in this example, the second magnetic connector 2404 is disposed in an opening 2904 in the bottom wall 2902 and coupled to the bottom wall 2902 via threaded fasteners 2906 (one of which is referenced in FIG. 29). In some examples, the bottom wall 2902 has a drain hole 2908 through which water and other debris that enters the seat tube 116 may exit or drain.

FIG. 30 shows the seat post 114 with the seat post connector assembly 1900 inserted further into the seat tube 116 of the frame 102. The first magnetic connector 2002 is shown as approaching the second magnetic connector 2404, but is not in alignment (e.g., axial alignment) with the second magnetic connector 2404. The magnetic field (shown in dashed lines) between the magnets 2212, 2512 (FIGS. 22 and 25) in the first and second magnetic connectors 2002, 2404 acts to bring the magnets 2212, 2512 and, therefore, the first and second magnetic connectors 2002, 2404 into alignment (e.g., axial alignment) with each other. When the seat post 114 is inserted into the seat tube 116 far enough, as shown in FIG. 31, the first and second magnetic connectors 2002, 2404 contact each other and are properly aligned, as explained in connection with FIG. 27. Therefore, the first and second magnetic connector 2002, 2404 are self-aligning and self-coupling. When the first and second magnetic connectors 2002, 2402 are mated, electrical connection is made between the drive unit 146 and the seat post 114. Therefore, electrical power can flow from the battery 144 (FIG. 1), through the drive unit 146, through the bicycle connector assembly 2400, through the seat post connector assembly 1900, and to the seat post 114. The drive unit 146 can apply power to activate the solenoid 422 (FIG. 1) to open the valve 420 or cease the supply of power to close the valve 420, as disclosed above.

Figure 32:
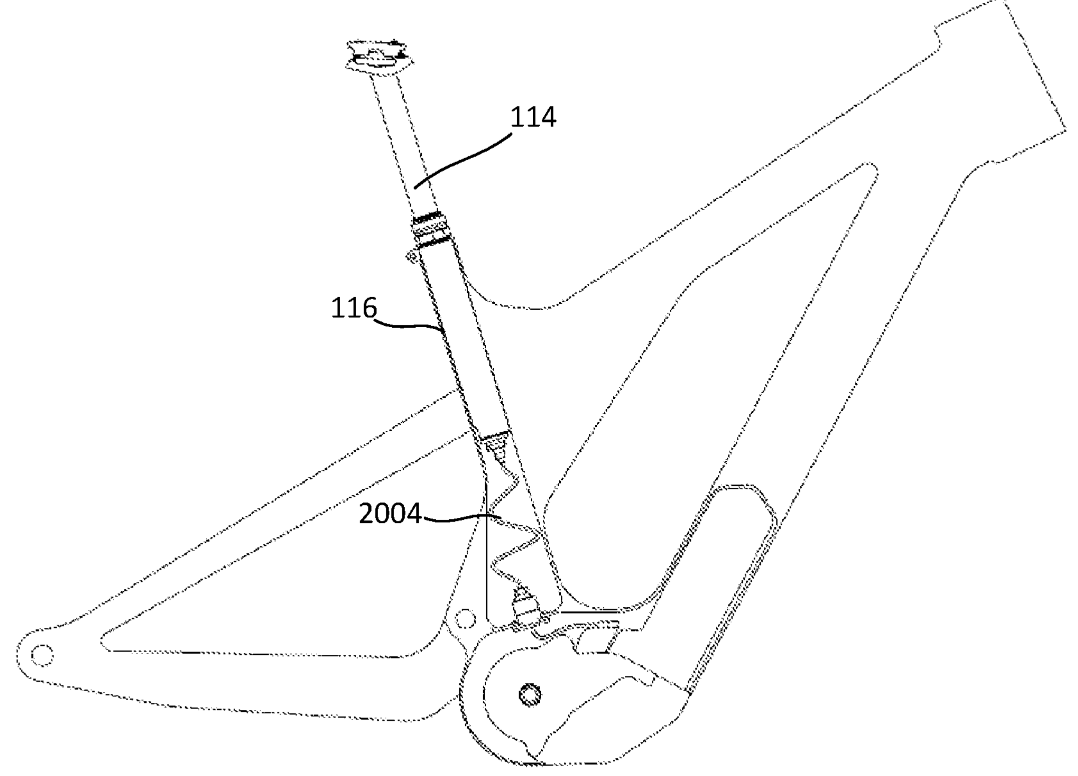
FIG. 32 shows the example height adjustable seat post of FIG. 31 inserted further into the seat tube such that the cable is bunched up in the bottom of the seat tube.

At this point, the rider may tighten the clamp 118 to fix the seat post 114 in place relative to the frame 102, or, if a lower seat position is desired, the rider may insert the seat post 114 further into the seat tube 116 as shown in FIG. 32. When the seat post 114 is inserted further into the seat tube 116, the excess length of the cable 2004 (the wires 2200, 2202 (FIG. 22)) may simply bunch up in the lower portion of the seat tube 116, as shown in FIG. 32. Thus, the system can accommodate a considerable variation in the insertion depth of the seat post 114.

To remove the seat post 114, a rider can loosen the clamp 118 and then can simply pull the seat post 114 out of the seat tube 116. When a sufficient amount of force is applied, the magnetic connection between the first and second magnetic connectors 2002, 2404 is broken, and the first magnetic connector 2002 disconnects from the second magnetic connector 2404. As disclosed above, the first and second magnets 2212, 2512 are not in direct contact with each other. This make it easier to disconnect the first and second magnetic connectors 2002, 2402 without causing excessive force on the wires.

Figure 33:
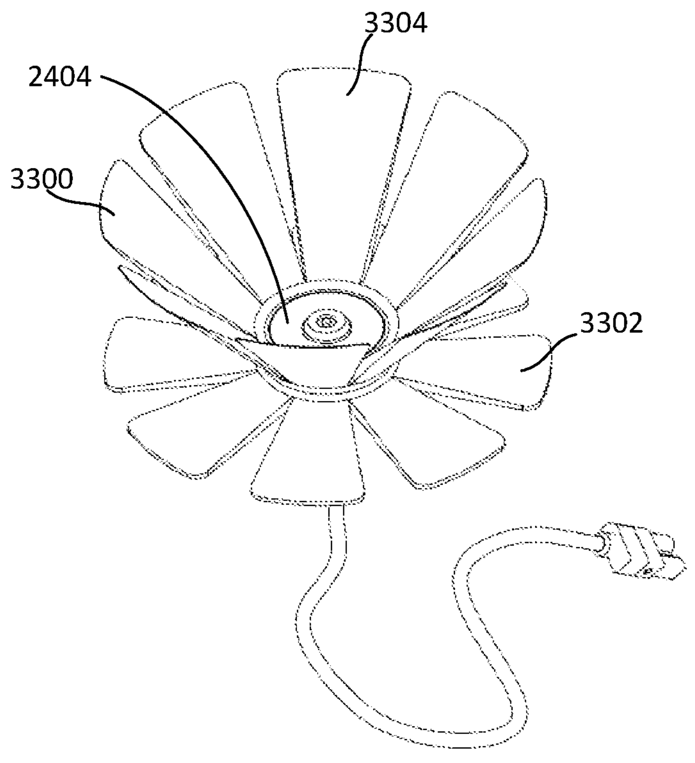
FIG. 33 shows an example guide coupled to the example bicycle connector assembly of FIG. 24.
Figure 34:
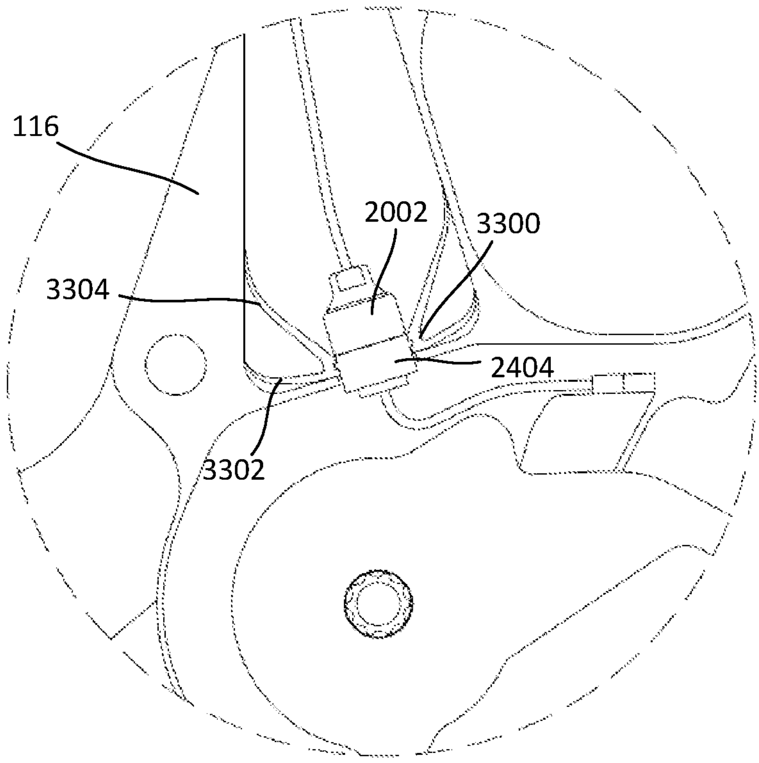
FIG. 34 shows the example guide of FIG. 33 installed in the seat tube of the bicycle.

In some examples, the bicycle 100 may include one or more features to help guide the first magnetic connector 2002 into alignment with the second magnetic connector 2404. For example, FIG. 33 shows an example guide 3300 coupled to the second magnetic connector 2404. In some examples, the guide 3300 is coupled to the second magnetic connector 2404 via an interference fit. In other examples, the guide 3300 can be coupled to the magnetic connector via other mechanisms (e.g., threaded fasteners). The guide 3000 has a first set of arms 3302 (one of which is referenced in FIG. 33) that are spaced radially around the second magnetic connector 2404. The guide 3300 also has a second set of arms 3304 (one of which is referenced in FIG. 33) that are spaced radially and the second magnetic connector 2404 and are spaced above the first set of arms 3302. FIG. 34 shows the second magnetic connector 2404 and the guide 3300 installed in the lower end of the seat tube 116. The first and second sets of arms 3302, 3304 are compressed against and conform to the inner surfaces of the seat tube 116. As shown, the second set of arms 3304 forms a funnel, which helps guide the first magnetic connector 2002 into alignment with the second magnetic connector 2404. Further, in this example, the second magnetic connector 2404 does not have a mounting flange to attach to the bottom wall 2902. Instead, the flex of the arms 3302, 3304 against the inner surfaces of the seat tube 116 holds the guide 3300 and the second magnetic connector 2404 in place. Therefore, the arms 3302, 3304 perform two functions: they help guide the first magnetic connector 2002 toward the second magnetic connector 2404, and they keep the guide 3300 and the second magnetic connector 2404 in place relative to the frame 102 (which also resists pull-out when the seat post 114 is removed from the seat tube 116).

Figure 35:
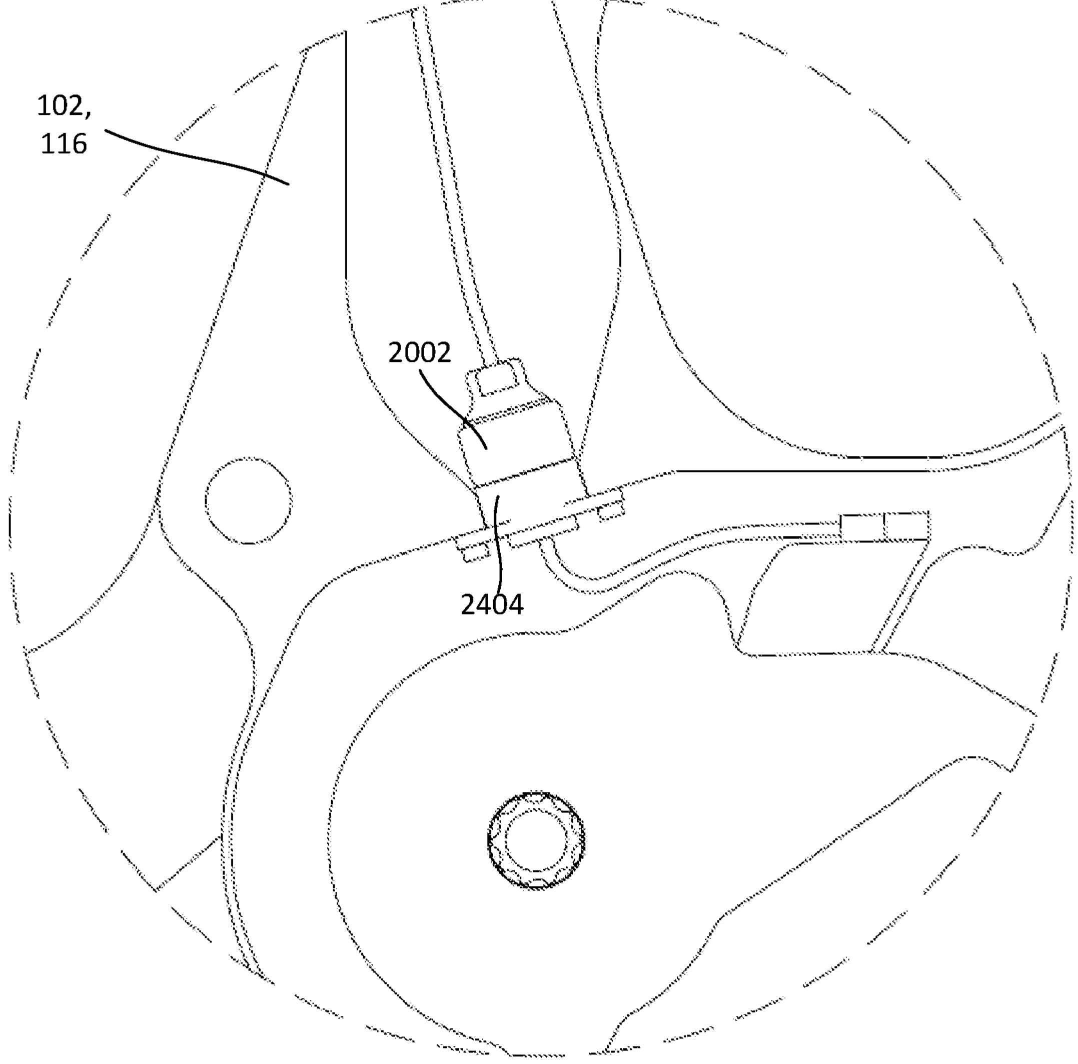
FIG. 35 shows an alternative shaped seat tube on the bicycle.

FIG. 35 shows an alternative bicycle frame design in which the lower section of the seat tube 116 is shaped to guide the first magnetic connector 2002 to the second magnetic connector 2404 as the seat post 114 is inserted into the seat tube 116 of the frame 102. In particular, in this example, the lower section of the seat tube 116 is funnel-shaped (e.g., the inner diameter decreases), at the bottom of which the second magnetic connector 2404 is located.

Figures 36A, 36B, 36C:
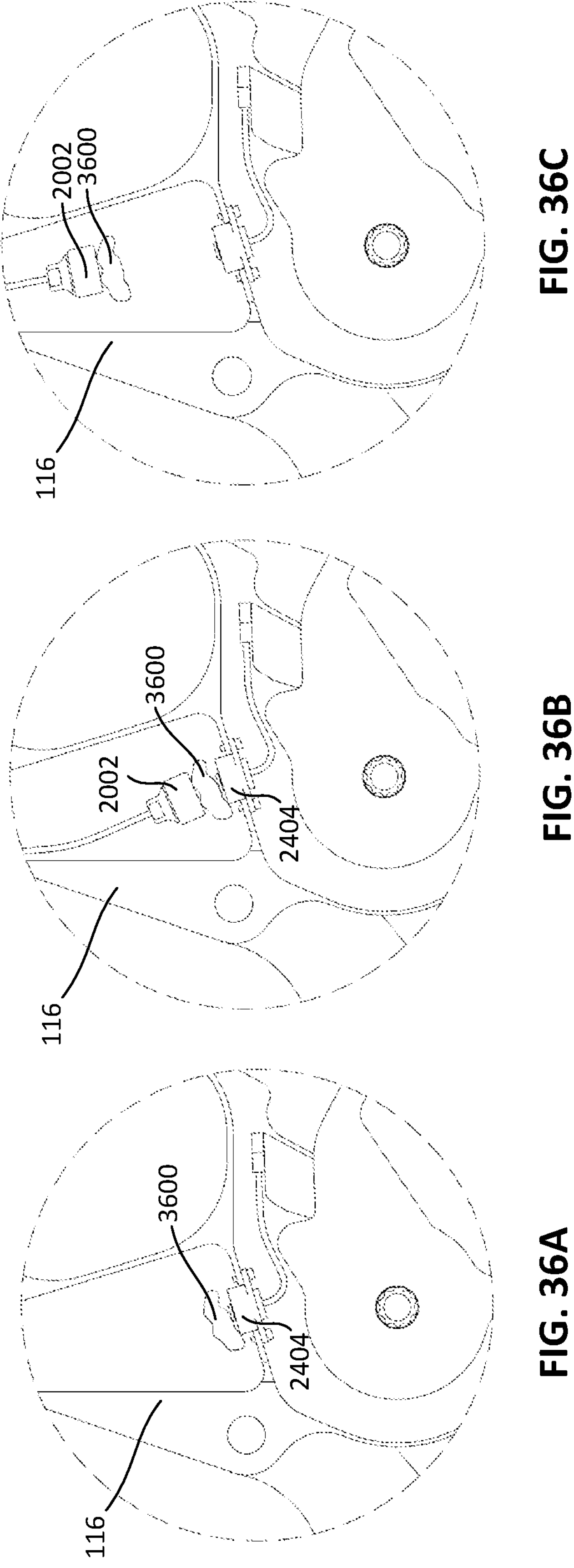
FIGS. 36A-36C show an example process of removing ferrous debris from the seat tube of the bicycle of FIG. 1 with the example seat post connector assembly of FIG. 19.

FIGS. 36A-36C show an example sequence or process by which ferrous debris that accidentally falls into the seat tube 116 can be removed. For example, FIG. 36A shows a piece of ferrous debris 3600 that has fallen into the seat tube 116 and is held onto the second magnetic connector 2404 by magnetic forces. The presence of this ferrous debris 3600 may prevent a proper electrical connection between the first and second magnetic connectors 2002, 2404. Referring to FIG. 36B, when the first magnetic connector 2002 is inserted into the seat tube 116, the first magnetic connector 2002 is magnetically attracted to the second magnetic connector 2404 and makes contact the ferrous debris 3600. Referring to FIGS. 22 and 25, the magnet 2212 is spaced from the end surface 2008 of the first magnetic connector 2002 by the first distance T1, and the magnet 2512 is spaced from the end surface 2410 of the second magnetic connector 2404 by the second distance T2. The second distance T2 is greater than the first distance T1. As such, the ferrous debris 3600 is closer to the magnet 2212 in the first magnetic connector 2002 than the second magnet 2512 in the second magnetic connector 2404. As a result, the magnetic forces acting to hold the ferrous debris 3600 to the first magnetic connector 2002 are greater than the magnetic forces acting to hold the ferrous debris 3600 to the second magnetic connector 2404. Therefore, when the first magnetic connector 2002 is pulled from the seat tube 116, as shown in FIG. 36C, the ferrous debris 3600 is removed with the first magnetic connector 2002, and a rider can simply discard the ferrous debris 3600. In some examples, T1 is less than 1.6 mm, and T2 is greater than 2.4 mm. However, in other examples, other distances can be used.

In some examples, the first magnet 2212 is a larger or stronger magnet (e.g., a more powerful magnet) than the second magnet 2512 in the second magnetic connector 2404. As a result, the ferrous debris 3600 sticks to the first magnetic connector 2002 when it is removed from the seat tube 116. In this manner, any ferrous debris that falls into the seat tube 116 and attaches to the second magnetic connector 2404 can be removed. In such an example, the distances T1 and T2 may be the same, or may be different as disclosed above.

While the example connector system 2600 is described in connection with the seat post 114, which has an internal solenoid-actuated valve, the example connector system 2600 can be implemented in connection with other types of seat posts, such as a seat post having an internal motor-actuated valve, a seat post having a rotary valve, a seat post having an actuator (e.g., motor, solenoid) that is external to the internal chambers, etc. Thus, the example connector system 2600 is not limited to use with the seat post 114 disclosed in connection with FIGS. 2-18.

Also, while the example pistons assemblies disclosed herein are described in connection with seat posts having a pneumatic platform, the examples disclosed herein can also be used in connection with hydraulic platforms. For example, instead of having pneumatic chambers filled with pressurized gas, the first and second chambers 416, 418 can be filled with a hydraulic fluid, such as oil. Therefore, the examples disclosed herein can be used in connection with valves for compressible or incompressible fluids. Also, while the examples disclosed herein utilize a battery on the bicycle, in other examples, the seat post may have a separate battery, such as a battery coupled directedly to the seat post.

The example piston assemblies with valves can also be used in other types of bicycle components. For example, any of the example piston assemblies and/or valves can be used in suspension components (e.g., a shock absorber, a front fork). A suspension component often includes first and second tubes arranged in a telescopic arrangement. The example piston assemblies and valves disclosed herein can be used as a damper or a spring component to control the flow of fluid between two chambers in the tube(s).

Example systems, apparatus, and articles of manufacture for bicycles (and/or other vehicles) are disclosed herein. Examples and combinations of examples disclosed herein include the following:

Example 1 is a height adjustable seat post for a bicycle. The height adjustable seat post comprises an upper tube and a lower tube configured in a telescopic arrangement. The lower tube to be coupled to a frame of the bicycle, the upper tube to be coupled to a seat. A piston assembly disposed in the upper tube. The piston assembly divides the upper tube into a first chamber and a second chamber. The first and second chambers are filled with fluid. The piston assembly includes a valve to control fluid flow between the first and second chambers. An actuator operates the valve. A connector assembly is connected to the lower tube. The connector assembly can be connected to a mating connector assembly on the bicycle. The connector assembly includes a magnetic connector including a housing having an end surface with an opening, first and second electrical contacts in the opening, and a magnet disposed in the housing and spaced from the end surface of the housing.

Example 2 includes the height adjustable seat post of Example 1, wherein the first electrical contact is coaxial with a central axis of the magnetic connector and the second electrical contact is radially offset from the central axis.

Example 3 includes the height adjustable seat post of Example 1 or 2, wherein the magnet is ring-shaped, and wherein the first and second electrical contacts are first and second pins extend through an inner diameter of the magnet.

Example 4 includes the height adjustable seat post of any of Examples 1-3, wherein the housing has an end wall and an annular side wall extending from the end wall, the end wall forming the end surface of the housing.

Example 5 includes the height adjustable seat post of any of Examples 1-4, wherein the housing includes a first housing portion and a second housing portion defining a cavity and, the magnet is disposed in the cavity.

Example 6 includes the height adjustable seat post of Example 5, wherein the connector assembly includes first and second electrical wires that extend through the housing and into the cavity, the first and second electrical contacts are first and second pins electrically coupled to respective ones of the first and second electrical wires.

Example 7 includes the height adjustable seat post of Example 6, further including a retainer in the cavity, the first and second pins disposed in respective channels in the retainer.

Example 8 includes the height adjustable seat post of Example 7, wherein the retainer has a flange, wherein the flange and the magnet are clamped between an edge of the second housing portion and an end wall of the first housing portion.

Example 9 includes the height adjustable seat post of Example 7 or 8, wherein the first and second pins are electrically isolated from the magnet by the retainer.

Example 10 includes the height adjustable seat post of any of the Examples 1-9, wherein the connector assembly includes a two-pin connector and a cable, the cable extending between the magnetic connector and the two-pin connector, the two-pin connector connected to an electrical connector on a lower end of the lower tube.

Example 11 includes the height adjustable seat post of any of the Examples 1-10, wherein the magnet is a neodymium magnet.

Example 12 is a connector system for electrically connecting a height adjustable seat post to an electrical system of a bicycle. The connector system comprises a seat post connector assembly to be connected to the height adjustable seat post. The seat post connector assembly includes a first magnetic connector including a first housing having a first end wall with a first end surface. The first housing has a first opening formed through the first end wall. First and second electrical contacts at least partially disposed in the first opening. A first magnet is disposed in the first housing and is spaced from the first end surface. A bicycle connector assembly can be connected to the electrical system. The bicycle connector assembly includes a second magnetic connector including a second housing having a second end wall with a second end surface. The second housing has a second opening formed through the second end wall, third and fourth electrical contacts at least partially disposed in the second opening, and a second magnet in the second housing. The second magnet is spaced from the second end surface. A magnetic attraction between the first and second magnets holds the first and second magnetic connectors together such that the first end surface is in contact with the second end surface and the first and second electrical contacts are in contact with the respective third and fourth electrical contacts.

Example 13 includes the connector system of Example 12, wherein the first magnet is spaced from the first end surface by a first distance and the second magnet is spaced from the second end surface by a second distance, the second distance greater than the first distance.

Example 14 includes the connector system of Example 12, wherein the first magnet is a stronger magnet than the second magnet.

Example 15 includes the connector system of Example 12, wherein the fourth electrical contact is ring-shaped, and the third electrical contact is disposed within the fourth electrical contact.

Example 16 includes the connector system of Example 15, wherein the first electrical contact is coaxial with a central axis of the first magnetic connector and the second electrical contact is radially offset from the central axis of the first magnetic connector.

Example 17 includes the connector system of Example 15, wherein the second magnetic connector includes a cylindrical insulator, a central channel in the fourth electrical contact, the cylindrical insulator to electrically separate the third and fourth electrical contacts.

Example 18 includes the connector system of any of the Examples 12-17, wherein the second magnetic connector includes a cap coupled to the second housing, and wherein the fourth electrical contact has a flange, the flange and the second magnet clamped between an edge of the cap and the second end wall.

Example 19 includes the connector system of any of the Examples 12-18, wherein the first and second magnets are neodymium magnets.

Example 20 includes the connector system of any of the Examples 12-19, wherein the second magnetic connector includes a seal coupled to the second housing and disposed in the second opening.

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A height adjustable seat post for a bicycle, the height adjustable seat post comprising:

an upper tube and a lower tube configured in a telescopic arrangement, the lower tube to be coupled to a frame of the bicycle, the upper tube to be coupled to a seat;

a piston assembly in the upper tube, the piston assembly dividing the upper tube into a first chamber and a second chamber, the first and second chambers filled with fluid, the piston assembly including a valve to control fluid flow between the first and second chambers;

an actuator to operate the valve; and a connector assembly connected to the lower tube, the connector assembly to be connected to a mating connector assembly on the bicycle, the connector assembly including a magnetic connector including:

a housing having an end surface with an opening;

first and second electrical contacts in the opening; and a magnet disposed in the housing and spaced from the end surface of the housing.

2. The height adjustable seat post of claim 1, wherein the first electrical contact is coaxial with a central axis of the magnetic connector and the second electrical contact is radially offset from the central axis.

3. The height adjustable seat post of claim 1, wherein the magnet is ring-shaped, and wherein the first and second electrical contacts are first and second pins extend through an inner diameter of the magnet.

4. The height adjustable seat post of claim 1, wherein the housing has an end wall and an annular side wall extending from the end wall, the end wall forming the end surface of the housing.

5. The height adjustable seat post of claim 1, wherein the housing includes a first housing portion and a second housing portion defining a cavity and, the magnet is disposed in the cavity.

6. The height adjustable seat post of claim 5, wherein the connector assembly includes first and second electrical wires that extend through the housing and into the cavity, the first and second electrical contacts are first and second pins electrically coupled to respective ones of the first and second electrical wires.

7. The height adjustable seat post of claim 6, further including a retainer in the cavity, the first and second pins disposed in respective channels in the retainer.

8. The height adjustable seat post of claim 7, wherein the retainer has a flange, wherein the flange and the magnet are clamped between an edge of the second housing portion and an end wall of the first housing portion.

9. The height adjustable seat post of claim 7, wherein the first and second pins are electrically isolated from the magnet by the retainer.

10. The height adjustable seat post of claim 1, wherein the connector assembly includes a two-pin connector and a cable, the cable extending between the magnetic connector and the two-pin connector, the two-pin connector connected to an electrical connector on a lower end of the lower tube.

11. The height adjustable seat post of claim 1, wherein the magnet is a neodymium magnet.

12. A connector system for electrically connecting a height adjustable seat post to an electrical system of a bicycle, the connector system comprising:

a seat post connector assembly to be connected to the height adjustable seat post, the seat post connector assembly including a first magnetic connector, the first magnetic connector including:

a first housing having a first end wall with a first end surface, the first housing having a first opening formed through the first end wall;

first and second electrical contacts at least partially disposed in the first opening; and a first magnet in the first housing, the first magnet spaced from the first end surface; and a bicycle connector assembly to be connected to the electrical system, the bicycle connector assembly including a second magnetic connector, the second magnetic connector including:

a second housing having a second end wall with a second end surface, the second housing having a second opening formed through the second end wall;

third and fourth electrical contacts at least partially disposed in the second opening; and a second magnet in the second housing, the second magnet spaced from the second end surface, wherein a magnetic attraction between the first and second magnets holds the first and second magnetic connectors together such that the first end surface is in contact with the second end surface and the first and second electrical contacts are in contact with the respective third and fourth electrical contacts.

13. The connector system of claim 12, wherein the first magnet is spaced from the first end surface by a first distance and the second magnet is spaced from the second end surface by a second distance, the second distance greater than the first distance.

14. The connector system of claim 12, wherein the first magnet is a stronger magnet than the second magnet.

15. The connector system of claim 12, wherein the fourth electrical contact is ring-shaped, and the third electrical contact is disposed within the fourth electrical contact.

16. The connector system of claim 15, wherein the first electrical contact is coaxial with a central axis of the first magnetic connector and the second electrical contact is radially offset from the central axis of the first magnetic connector.

17. The connector system of claim 15, wherein the second magnetic connector includes a cylindrical insulator, a central channel in the fourth electrical contact, the cylindrical insulator to electrically separate the third and fourth electrical contacts.

18. The connector system of claim 12, wherein the second magnetic connector includes a cap coupled to the second housing, and wherein the fourth electrical contact has a flange, the flange and the second magnet clamped between an edge of the cap and the second end wall.

19. The connector system of claim 12, wherein the first and second magnets are neodymium magnets.

20. The connector system of claim 12, wherein the second magnetic connector includes a seal coupled to the second housing and disposed in the second opening.

* * * * *